US011194973B1

(12) United States Patent
Goel et al.

(10) Patent No.: US 11,194,973 B1
(45) Date of Patent: Dec. 7, 2021

(54) DIALOG RESPONSE GENERATION

(71) Applicant: Amazon Technologies, Inc., Seattle, WA (US)

(72) Inventors: Rahul Goel, Sunnyvale, CA (US); Chandra Prakash Khatri, San Jose, CA (US); Tagyoung Chung, Sunnyvale, CA (US); Raefer Christopher Gabriel, San Jose, CA (US); Anushree Venkatesh, San Mateo, CA (US); Behnam Hedayatnia, San Francisco, CA (US); Sanghyun Yi, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 256 days.

(21) Appl. No.: 16/363,363

(22) Filed: Mar. 25, 2019

Related U.S. Application Data

(60) Provisional application No. 62/760,014, filed on Nov. 12, 2018.

(51) Int. Cl.
| | |
|---|---|
| *G06F 40/35* | (2020.01) |
| *G10L 15/26* | (2006.01) |
| *G06F 40/289* | (2020.01) |
| *H04L 12/58* | (2006.01) |
| *G06N 20/00* | (2019.01) |

(52) U.S. Cl.
CPC ............ *G06F 40/35* (2020.01); *G06F 40/289* (2020.01); *G06N 20/00* (2019.01); *G10L 15/26* (2013.01); *H04L 51/02* (2013.01)

(58) Field of Classification Search
CPC ....... G06F 40/35; G06F 40/289; G10L 15/26; H04L 51/02; G06N 20/00
USPC ........................................................ 704/235
See application file for complete search history.

(56) References Cited

U.S. PATENT DOCUMENTS

| | | | | |
|---|---|---|---|---|
| 6,570,555 | B1* | 5/2003 | Prevost ..................... | G06F 3/01 345/156 |
| 6,731,307 | B1* | 5/2004 | Strubbe .................. | G06N 3/004 715/727 |
| 7,099,855 | B1* | 8/2006 | Nelken ................... | G06N 5/022 706/50 |
| 8,566,102 | B1* | 10/2013 | Bangalore ............... | G10L 15/22 704/270.1 |
| 9,929,982 | B2* | 3/2018 | Morris ..................... | H04L 51/02 |
| 10,449,930 | B1* | 10/2019 | Silva ....................... | G06N 3/006 |
| 10,558,740 | B1* | 2/2020 | O'Malley ............. | G06F 40/197 |

(Continued)

*Primary Examiner* — Edwin S Leland, III
(74) *Attorney, Agent, or Firm* — Pierce Atwood LLP

(57) ABSTRACT

A system that can engage in a dialog with a user may select a system response to a user input based on how the system estimates a user may respond to a potential system response. Models may be trained to evaluate a potential system response in view of various available data including dialog history, entity data, etc. Each model may score the potential system response for various qualitative aspects such as whether the response is likely to be comprehensible, on-topic, interesting, likely to lead to the dialog continuing, etc. Such scores may be combined to other scores such as whether the potential response is coherent or engaging. The models may be trained using previous dialog/chatbot evaluation data. At runtime the scores may be used to select a system response to a user input as part of the dialog.

15 Claims, 16 Drawing Sheets

Runtime evaluation

(56) References Cited

U.S. PATENT DOCUMENTS

| | | | | |
|---|---|---|---|---|
| 2004/0254904 | A1* | 12/2004 | Nelken | G06N 5/022 |
| | | | | 706/50 |
| 2017/0063745 | A1* | 3/2017 | Banerjee | G06Q 30/0203 |
| 2017/0160813 | A1* | 6/2017 | Divakaran | G06K 9/00221 |
| 2017/0270099 | A1* | 9/2017 | Gorny | G06Q 30/01 |
| 2017/0337184 | A1* | 11/2017 | Quah | G06F 40/56 |
| 2017/0371861 | A1* | 12/2017 | Barborak | G06N 3/006 |
| 2018/0060301 | A1* | 3/2018 | Li | G06N 3/08 |
| 2018/0240014 | A1* | 8/2018 | Strope | H04L 51/02 |
| 2019/0130904 | A1* | 5/2019 | Homma | G06N 3/0445 |
| 2019/0318724 | A1* | 10/2019 | Chao | G10L 15/14 |
| 2019/0341036 | A1* | 11/2019 | Zhang | G10L 15/063 |
| 2020/0005118 | A1* | 1/2020 | Chen | G06N 3/006 |
| 2020/0007380 | A1* | 1/2020 | Chen | H04L 41/046 |

\* cited by examiner

Evaluator Training

Runtime evaluation

Training

Runtime

DIALOG RESPONSE GENERATION

CROSS-REFERENCE TO RELATED APPLICATION

This application claims the benefit of priority of U.S. Provisional Patent Application No. 62/760,014, filed Nov. 12, 2018 and titled "DIALOG RESPONSE GENERATION," in the names of Rahul Goel, et al., which is herein incorporated by reference in its entirety.

BACKGROUND

Speech recognition systems have progressed to the point where humans can interact with computing devices using their voices. Such systems employ techniques to identify the words spoken by a human user based on the various qualities of a received audio input. Speech recognition combined with natural language understanding processing techniques enable speech-based user control of a computing device to perform tasks based on the user's spoken commands. Speech processing refers to the combination of speech recognition and natural language understanding processing techniques. Speech processing may also involve converting a user's speech into text data, which may then be provided to various text-based software applications.

Computers, hand-held devices, telephone computer systems, kiosks, and a wide variety of other devices may use speech processing to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
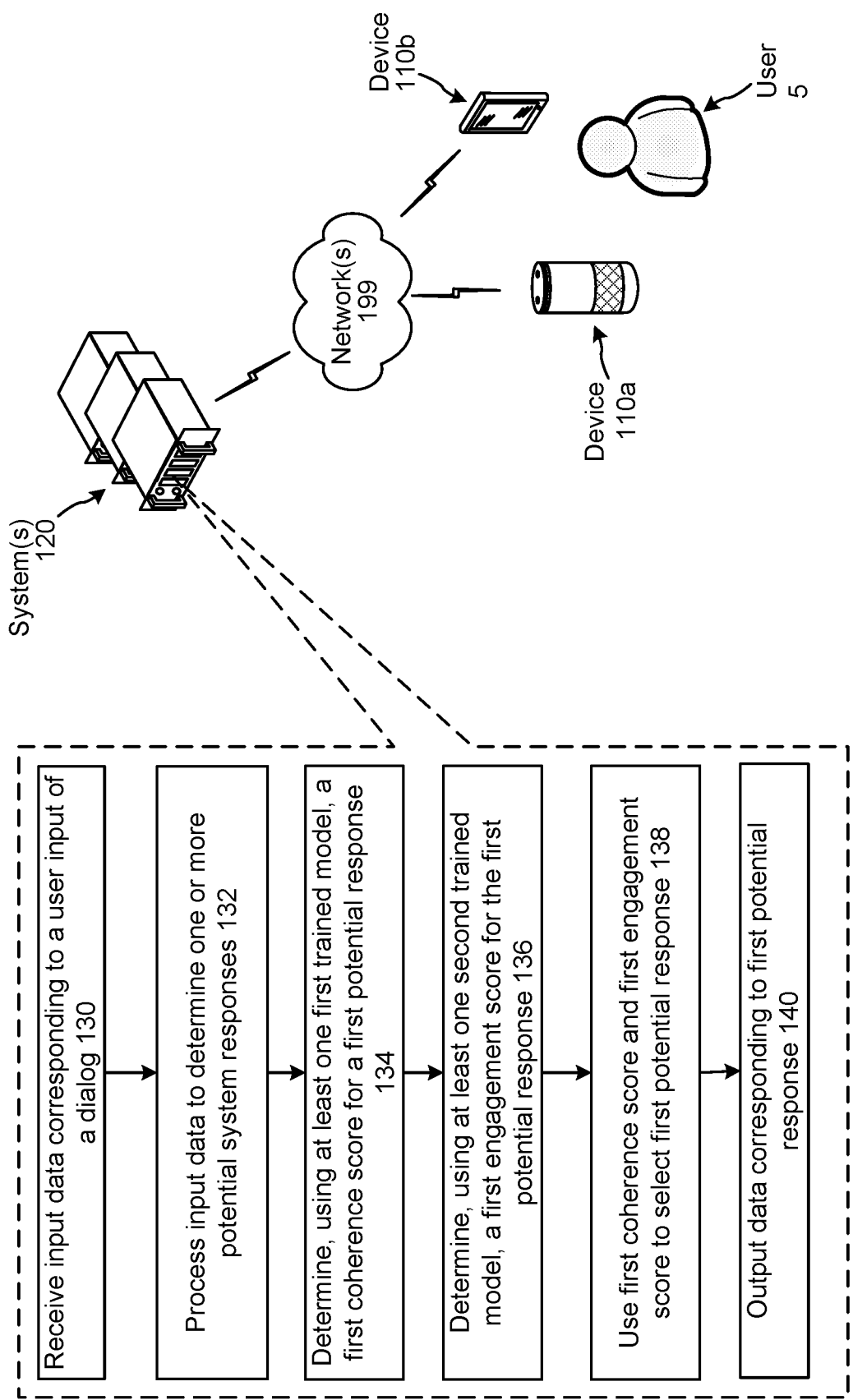
FIG. 1 illustrates a system configured to score and select dialog responses according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain systems may be configured to perform actions responsive to user inputs. For example, for the user input of "Alexa, play Adele music," a system may output music sung by an artist named Adele. For further example, for the user input of "Alexa, what is the weather," a system may output synthesized speech representing weather information for a geographic location of the user. In a further example, for the user input of "Alexa, send a message to John," a system may capture spoken message content and cause same to be output via a device registered to "John."

The system may also be configured to respond to the user across multiple exchanges between the user and the system. For example, the user may ask the system "play me some music" and the system may respond "what are you in the mood for?" The user may respond "something relaxing" and the system may respond "how about smooth jazz?" Such exchanges may be part of an ongoing conversation between the system and a user, which may be referred to as a dialog. As used herein, a "dialog," "dialog session," "session," or the like refers to various related user inputs and system outputs, for example inputs and outputs related to an ongoing exchange between a user and the system.

A dialog may be goal-oriented, meaning the dialog is directed to the system performing a specific action requested by a user (such as figuring out what music the system should play). Alternatively, a dialog may not be goal-oriented, for example as part of a freeform conversation between the system and a user that may not have a definite end point or action in mind at the end of the conversation. For example, a user may ask a system "Alexa, tell me something interesting" or "Alexa, let's have a conversation." System components that control what actions the system takes in response to various user inputs of a dialog may sometimes be referred to as chatbots.

A user input and performance by the system of a corresponding action responsive to the user input, may be referred to as a dialog "turn." A dialog session identifier may be associated with multiple related turns corresponding to consecutive related user inputs. One user input may be considered related to a subsequent user input, thereby causing a single dialog session identifier to be associated with both user inputs, based on, for example, a length of time between receipt of the first user input and receipt of the subsequent user input and/or a length of time between performance of an action responsive to the first user input and receipt of the subsequent user input.

Systems configured to engage in dialogs with a user may use the dialog session identifier or other data to track the progress of the dialog to select system responses in a way that tracks the previous user-system exchanges, thus moving the dialog along in a manner that results in a desirable user experience. Systems may incorporate information such as the dialog history (which may include user inputs, system responses, or other data relevant to the dialog) in the natural language understanding (NLU) operations when interpreting user inputs so the system can select an appropriate response to what the user said.

Configuring a chatbot that leads to desirable user experience can be a difficult task. Many different approaches have been taken to design chatbot components, including using various trained machine learning (ML) models to control the chatbot experiences. For example, neural network architectures can be employed to build an open-domain dialog system, such as for a chatbot. While such conversational interfaces may focus on completing specific tasks, there is an increasing effort for such interfaces to include capability to hold "chit-chat-like" conversations with a user.

For example, while a generic response can be acceptable or even preferable in some situations (such as the system outputting, "OK" after being asked to turn on the lights or lock the doors), these same type of generic responses in a conversation (e.g., such as "maybe," "sounds good," or "I don't know," etc.) may be bland and convey little information leading to short chatbot exchanges and low user satisfaction. Thus, overuse of such responses may result in a less than optimal user experience when interacting with the system. To address this concern, a system may choose a system response based on an analysis of whether the system response will be deemed by a user to be relevant and interesting as part of the dialog. Such an analysis of relevance and interest may be made at each turn to mitigate the general response problem and generally provide a more desirable user experience.

Described herein, among other things, is a system that can evaluate potential system responses for a dialog turn with respect to whether each potential response will improve (or maintain) the quality of the dialog. For example, whether a particular response make sense within the current conversation (e.g., be coherent)/be an appropriate response to the user input and whether a user will react positively to the response, e.g., the response will engage the user. Such an evaluation may take place at each turn of a dialog, for example when selecting the next system response. To make such an evaluation, the system may train one or more models to determine scores corresponding to how a particular potential system response may impact the quality of the dialog. For example, the system may train and operate a model that may evaluate the potential coherence of a potential dialog response (e.g., whether the potential response will make sense within the dialog/is an appropriate response to the most recent user input and/or within the dialog exchange thusfar). The system may also train and operate a model that may evaluate as the potential engagement of the potential dialog response (e.g., how well the user will react to the dialog response). Other models may also be trained and operated to evaluate the quality of a potential dialog response. Training of such models may occur using many training dialog turns and conversations between users and chatbots, where each training dialog turn includes user evaluation data (to be used as ground truth data) corresponding to the desired quality to be evaluated (e.g., coherence and/or engagement). At runtime, an individual model may be used to score potential dialog responses relative to the quality corresponding to that model (e.g., coherence, engagement, etc.) with the highest scoring responses selected for return to the user as part of the dialog. In this manner the system may result in a more desirable dialog chatbot experience.

FIG. 1 illustrates a system configured to rescore language model output data according to embodiments of the present disclosure. Although the figures and discussion illustrate certain operational steps of the system in a particular order, the steps described may be performed in a different order (as well as certain steps removed or added) without departing from the intent of the disclosure. As illustrated in FIG. 1, the system may include a device 110a and/or device 110b local to a user 5 and one or more systems 120 connected across one or more networks 199.

As shown in FIG. 1, system(s) 120 receive (130) input data corresponding to a user input that is part of a system dialog. The input data may include audio data 211 that corresponds to a user utterance. The utterance may be spoken by the user 5 and captured by the device 110a. User 5 and device 110a may be participating in a dialog session, where the user 5 may speak an utterance and the system(s) 120 may generate a text-to-speech response to the utterance, which is then sent to device 110a for playback. Alternatively, the input data may come in the form of text data 213, such as text data sent from device 110b as part of a text-based dialog between the user 5 and the system(s) 120. If the input data is audio data, the system(s) 120 may perform automatic speech recognition (ASR) using the input audio data to generate text data 213. The user input may also take another form, such as device motion data (e.g., a device being shaken or moved in a particular manner), gesture data (e.g., an image capture device detecting a user shrug or head nod, etc.), or some other form. For present purposes, the focus of the discussion may revolve around user inputs received in audio or text form, but other input forms are also possible.

The user input may be processed (132) by a dialog management component or other component of the system(s) 120 to determine one or more potential system responses to the user input. The system may determine (134), using at least one first trained model, a first coherence score for a first response of the potential responses. The coherence score may correspond to an estimate as to whether the response will make sense within the dialog conversation/whether the potential response is an appropriate response to the user input and/or within the dialog conversation thusfar. As noted below, the coherence score may be a combination of two other scores, for example one score corresponding to whether a response is comprehensible and another score corresponding to whether the response is on topic. The system may also determine (136), using at least one second trained model, a first engagement score for the first response. The engagement score may correspond to an estimate as to how well the user will react to the dialog response. As noted below, the engagement score may be a combination of two other scores, for example one score corresponding to whether the response is interesting and another score corresponding to if a user is likely to continue the conversation if given the response. The system may also calculate coherence and engagement scores (or other scores) for the other potential responses. The system may then select the potential response with the most desirable combination of coherence and engagement scores. Thus the system may use (138) the first coherence score and the first engagement score to select the first potential response. The system may then output (140) data corresponding to the first potential response. For example, the system may use the selected response to continue the dialog with the user (e.g., by outputting that response in text form through device 110b, outputting that response in audio data form following TTS processing and audio output using device 110a) or in some other form. The form of the scores discussed herein is configurable. For example a score may be a numerical representation with a value from 0 to 1, a score may be a numerical representation with a value from 0 to 100, a score may be a percentage, a score may be a ranking relative to other items being ranked, etc.

Figure 2:
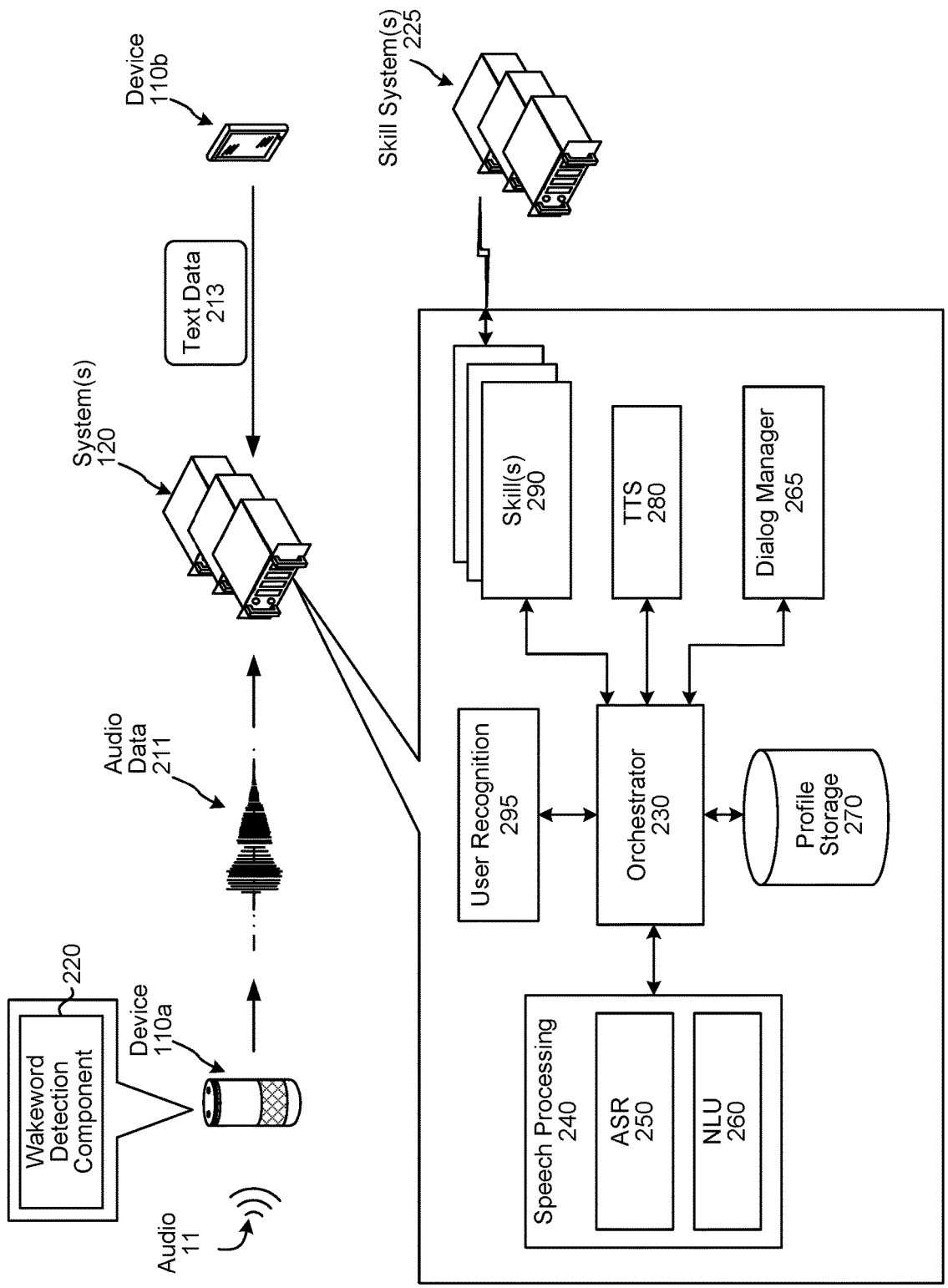
FIG. 2 is a conceptual diagram of speech processing components of a system according to embodiments of the present disclosure.

The overall system of the present disclosure may operate using various components as illustrated in FIG. 2. The various components may be located on same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator component 230 sends the input audio data 211 to a speech processing component 240. An ASR component 250 of the speech processing component 240 transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The NLU component 260 receives the ASR hypothesis/ hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include a dialog manager component 265 that manages and/or tracks a dialog between a user and a device. The dialog manager component 265 may associate a dialog session identifier with the dialog upon identifying that the user is engaging in a dialog with the user. The dialog manager component 265 may track a user input and the corresponding system generated response to the user input as a turn. The dialog session identifier may correspond to multiple turns of user input and corresponding system generated response. The dialog manager component 265 may transmit data identified by the dialog session identifier directly to the orchestrator component 230 or other component. Depending on system configuration the dialog manager 265 may determine the appropriate system generated response to give to a particular utterance or user input of a turn. Or creation of the system generated response may be managed by another component of the system (e.g., the orchestrator 230, NLU component 260, etc.) while the dialog manager 265 selects the appropriate responses. Alternatively, another component of the system(s) 120 may select responses using techniques discussed herein. The text of a system generated response may be sent to a TTS component 280 for creation of audio data corresponding to the response. The audio data may then be sent to a user device (e.g., device 110a) for ultimate output to the user. Alternatively (or in addition) a dialog response may be returned in text or some other form.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The profile storage 270 may also store or link to personalized models for dialog management. For example, one or more dialog evaluators 860 (or other models used for dialog management) may be customized for a particular user or a particular group of users. Such models may be managed by the dialog manager 265 and/or by profile storage 270.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 3:
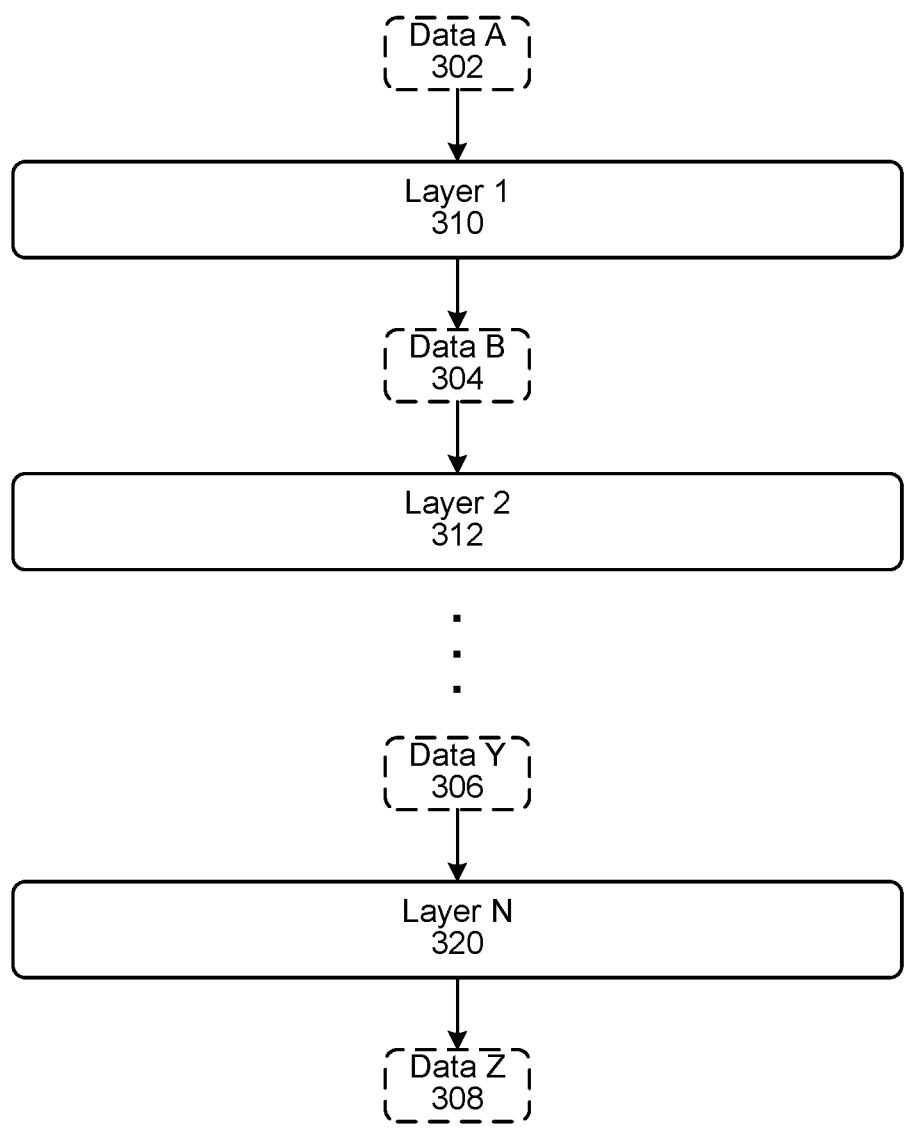
FIG. 3 is a conceptual diagram illustrating layers of a trained model according to embodiments of the present disclosure.

One or more components, such as dialog evaluators 860 (discussed below), ranker 1120 (discussed below), etc. may use trained models for operation. A trained model may take many forms, including a neural network. As illustrated in FIG. 3, a neural network may include a number of layers, from input layer 1 310 through output layer N 320. Each layer is configured to output a particular type of data and output another type of data. The neural network illustrated in FIG. 3 is configured to input data of type data A 302 (which is the input to layer 1 310) and output data of type data Z 308 (which is the output from the last layer N 320). The output from one layer is then taken as the input to the next layer. For example, the output data (data B 304) from layer 1 310 is the input data for layer 2 312 and so forth such that the input to layer N 320 is data Y 306 output from the penultimate layer (not shown).

While values for the input data/output data of a particular layer are not known until a neural network is actually operating during runtime, the data describing the neural network describes the structure and operations of the layers of the neural network.

Figure 4:
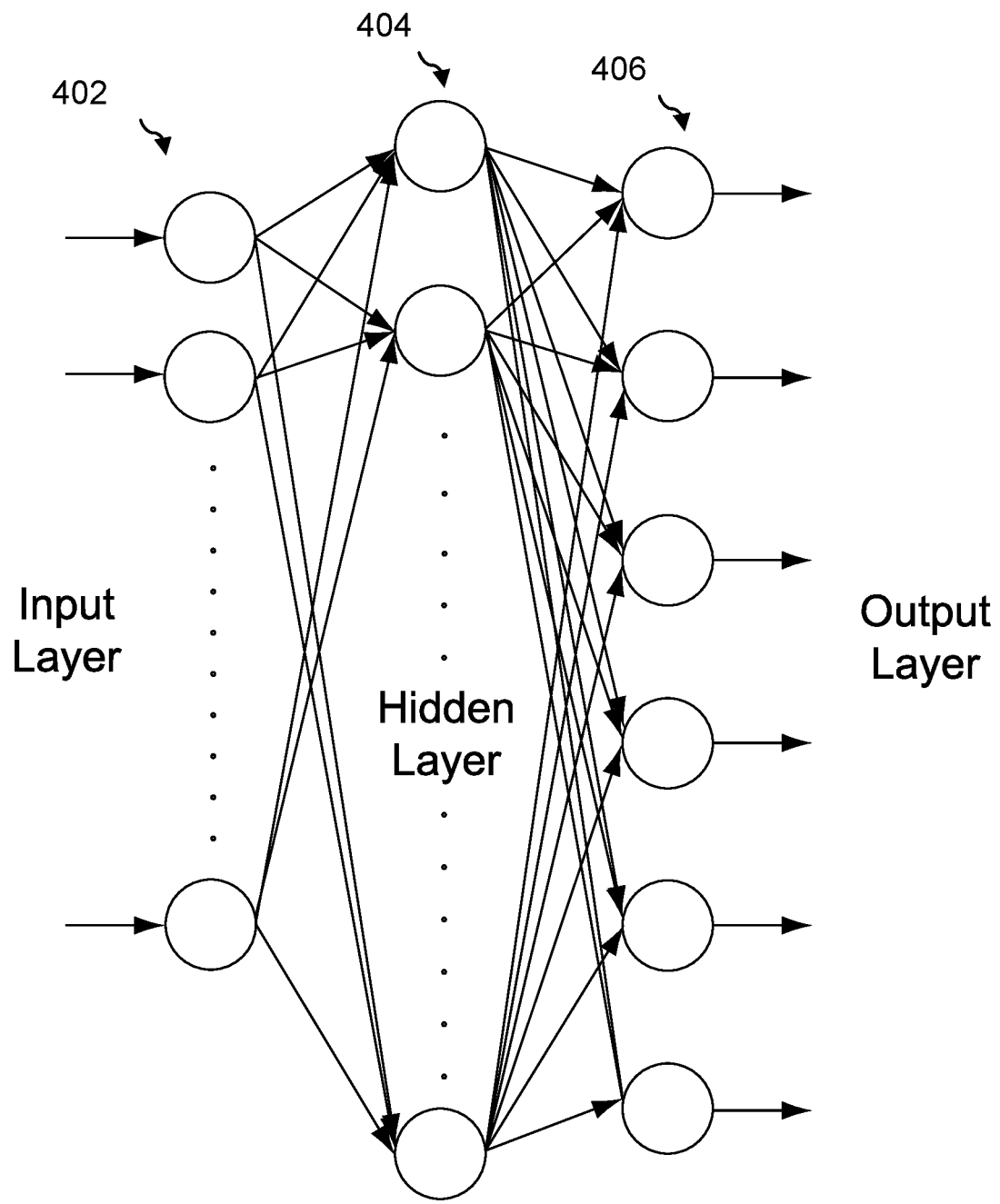
FIG. 4 illustrates a neural network for speech recognition according to embodiments of the present disclosure.

Neural networks may be used to perform dialog evaluation and/or scoring. An example neural network is illustrated in FIG. 4. A neural network may be structured with an input layer 402, a middle layer 404, and an output layer 406. The middle layer may also be known as the hidden layer. Each node of the hidden layer is connected to each node in the input layer and each node in the output layer. Although illustrated in FIG. 4 with a single hidden layer, a neural network may include multiple middle layers. In this case each node in a hidden layer will connect to each node in the next higher layer and next lower layer. Each node of the input layer represents a potential input to the neural network and each node of the output layer represents a potential output of the neural network. Each connection from one node to another node in the next layer may be associated with a weight or score. A neural network may output a single output or a weighted set of possible outputs.

Figure 5:
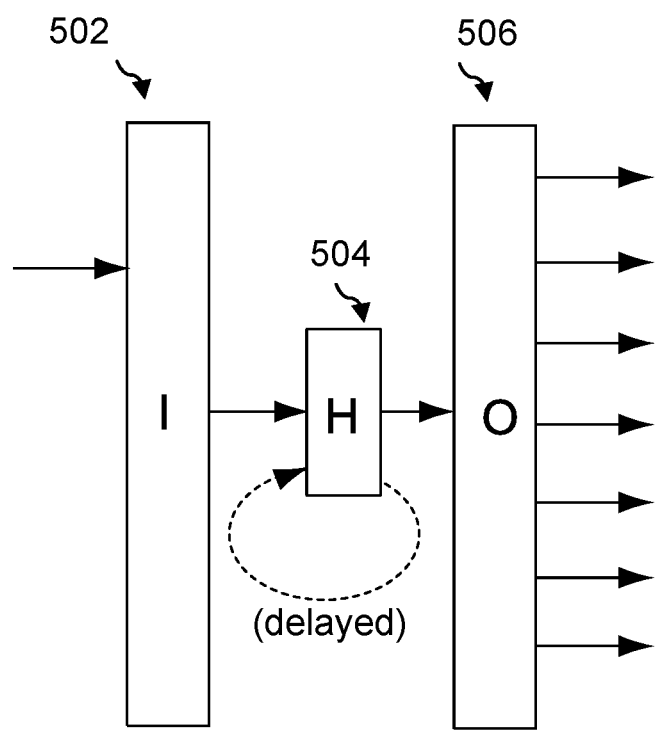
FIG. 5 illustrates a neural network for speech recognition according to embodiments of the present disclosure.

In one aspect, the neural network may be constructed with recurrent connections such that the output of the hidden layer of the network feeds back into the hidden layer again for the next set of inputs. Such a neural network is illustrated in FIG. 5. Each node of the input layer 502 connects to each node of the hidden layer 504. Each node of the hidden layer 504 connects to each node of the output layer 506. As illustrated, the output of the hidden layer 504 is fed back into the hidden layer for processing of the next set of inputs. A neural network incorporating recurrent connections may be referred to as a recurrent neural network (RNN).

To perform various operations effectively certain techniques may be employed to incorporate certain information in a form that can be considered by a trained model. Such information may include, for example, dialog data from user inputs and system responses, etc. One such technique for putting information in a form operable by a trained model, for example, is use of an encoder. Encoding is a general technique for projecting a sequence of features into a vector space. One goal of encoding is to project data points into a multi-dimensional vector space so that various operations can be performed on the vector combinations to determine how they (or the data they contain) relate to each other. For example, if usage of two sentences such as "What's the weather today?" and "Is it going to rain today?" are projected into a vector space (where each vector is populated with data points representing how or when the sentences are used), the two sentences would likely end up being close to each other in the vector projection space, thus representing the similar usage of the two sentences. It can be valuable to encode certain features into a vector space to perform various operations.

Figure 6:
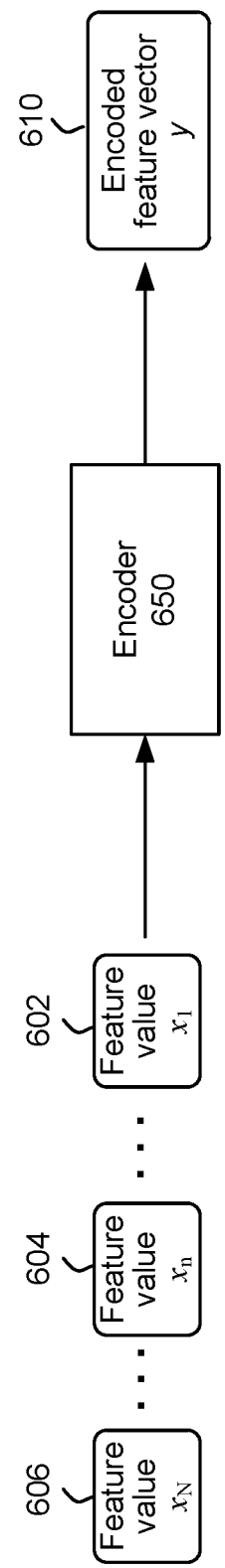
FIG. 6 illustrates operation of an encoder according to embodiments of the present disclosure.

FIG. 6 illustrates feature data values 602-606 being processed by an encoder 650 to generate an encoded feature vector y. In mathematical notation, given a sequence of feature data values $x_1, \ldots x_n, \ldots x_N$, with $x_n$ being a D-dimensional vector, an encoder $E(x_1, \ldots x_N)=y$ projects the feature sequence to y, with y being a F-dimensional vector. F is a fixed length of the vector and is configurable depending on user of the encoded vector and other system configurations. Any particular encoder 650 will be configured to output vectors of the same size, thus ensuring a continuity of output encoded vector size from any particular encoder 650 (though different encoders may output vectors of different fixed sizes). The value y may be called an embedding of the sequence $x_1, \ldots x_N$. The length of $x_n$ and y are fixed and known a-priori, but the length of N of feature sequence $x_1, \ldots x_N$ is not necessarily known a-priori. The encoder may be implemented as a recurrent neural network (RNN), for example as a long short-term memory RNN (LSTM-RNN) or as a gated recurrent unit RNN (GRU-RNN). An RNN is a tool whereby a network of nodes may be represented numerically and where each node representation includes information about the preceding portions of the network. For example, the RNN performs a linear transformation of the sequence of feature vectors which converts the sequence into a fixed size vector. The resulting vector maintains features of the sequence in reduced vector space that can otherwise be arbitrarily long. The output of the RNN after consuming the sequence of feature data values is the encoder output. There are a variety of ways for the RNN encoder to consume the encoder output, including but not limited to:

linear, one direction (forward or backward),
bi-linear, essentially the concatenation of a forward and a backward embedding, or
tree, based on parse-tree of the sequence.

In addition, an attention model can be used, which is another RNN or DNN that learns to "attract" attention to certain parts of the input. The attention model can be used in combination with the above methods of consuming the input.

FIG. 6 illustrates operation of the encoder 650. The input feature value sequence, starting with feature value $x_1$ 602, continuing through feature value $x_n$ 604 and concluding with feature value $x_N$ 606 is input into the encoder 650. The encoder 650 may process the input feature values as noted above. The encoder 650 outputs the encoded feature vector y 610, which is a fixed length feature vector of length F. One or more encoders such as 650 may be used with the dialog rescorer engine 259 as indicated below.

For various operations, such as selecting and/or scoring potential dialog responses, a system may be configured to encode text data that may include one or more word sequences (for example dialog data from one or more previous exchanges with the system during a dialog) and use that encoded text data to score potential dialog responses.

A word sequence is usually represented as a series of one-hot vectors (i.e., a N-sized vector representing the N available words in a lexicon, with one bit high to represent the particular word in the sequence). The one-hot vector is often augmented with information from other models, which have been trained on large amounts of generic data, including but not limited to word embeddings that represent how individual words are used in a text corpus, labels from a tagger (e.g., part-of-speech (POS) or named entity tagger), labels from a parser (e.g., semantic or dependency parser), etc.

Thus components of the system (such as a dialog manager 265) may be configured to use word embeddings in their operations. A word embedding is a representation of a word in the form of a multi-dimensional data vector, where each dimension represents some data point regarding the word, its usage, or other information about the word. To create word embeddings a text corpus is obtained that represents how words are used. The text corpus may include information such as books, news content, internet articles, etc. The system then creates multiple vectors, each corresponding to the usage of a particular word (e.g., the usage of the word in the source text corpus), and map those vectors into a vector space. Given the number of dimensions for each vector, the vector space may be a high dimensional vector space. The different dimensions for each data vector may correspond to how a word is used in the source text corpus. Thus the word embedding data represented in the individual values of a word embedding data vector may correspond to how the respective word is used in the corpus.

A number of known techniques for manipulating vectors in high dimensional (or other) vector space may be used to analyze vectors and compare vectors to each other. One example for representing and analyzing word usage characteristic as vectors with word embedding data is the GloVe: Global Vectors for Word Representation project by Jeffery Pennington, Richard Socher, and Christopher D. Manning of the Computer Science Department of Stanford University published in 2014. Other word embedding techniques and/or formats may be used. Further, vectors are one example of tracking and comparing word usage characteristics, other techniques may be used.

Figure 7:
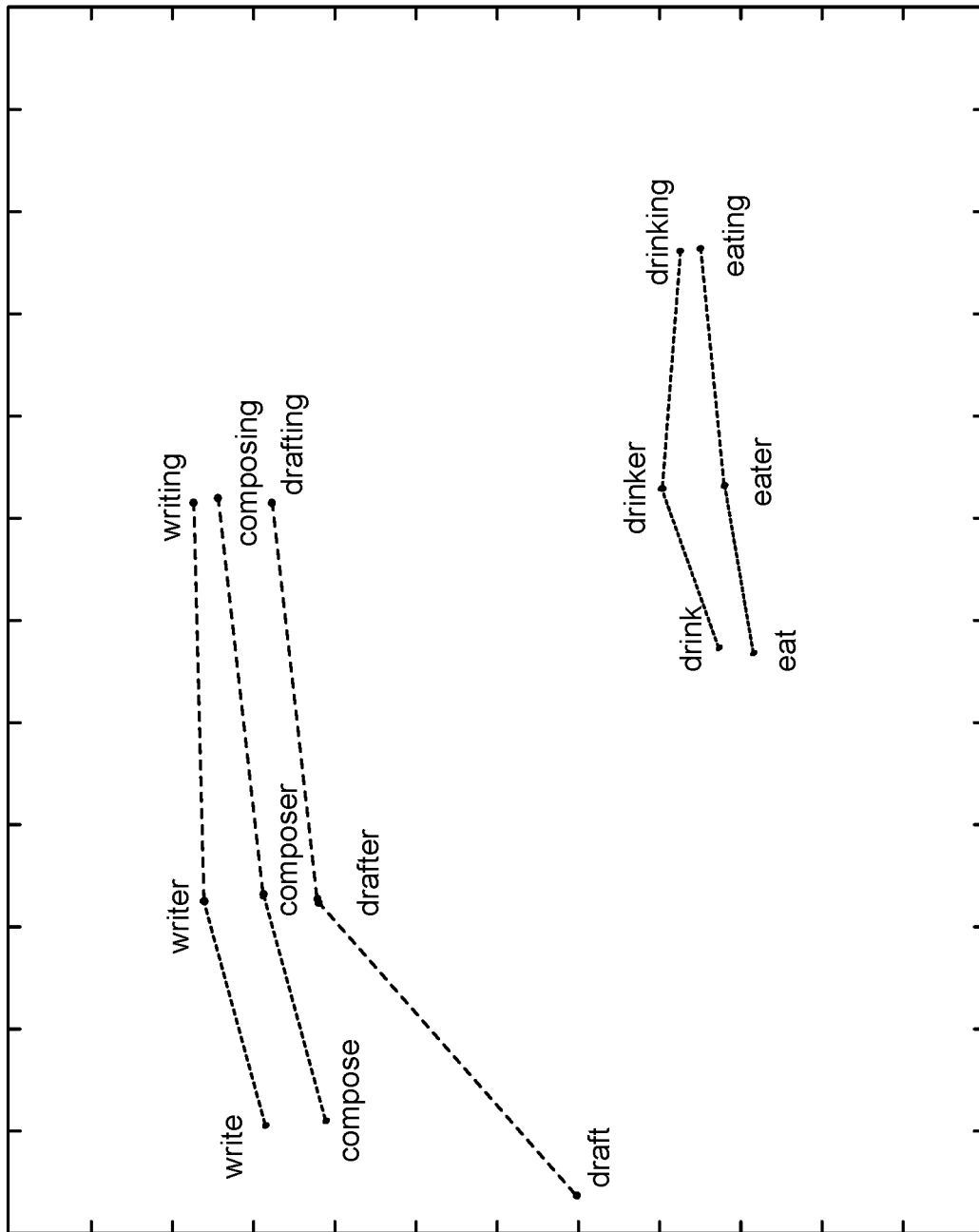
FIG. 7 illustrates representations of word usage similarity in a vector space.

Representing words in a vector space may be useful for showing the relationship between usage of individual words, as well as showing the relationship between usage of variations of a particular word and showing the relationship between the same usage variation across different word roots. Thus, a vector space may be used to represent sematic relationships between words as geometric relationship between vectors. For example, FIG. 7 illustrates a number of words in a hypothetical vector space where each point represents the vector location for the particular word. Although illustrated as located in a two-dimensional graph for discussion purposes, the usage vectors for the words illustrated in FIG. 7 would be in a high dimensional space. Further, FIG. 7 is shown for example purposes only and the vector locations/relationships do not necessarily reflect a true graphing of the usage of the illustrated words.

As illustrated in FIG. 7, certain words that have similar meaning may be close to each other in the vector space (indicating a similarity of usage characteristics). Also, certain words that have different meanings may also be close to each other in the vector space (also indicating a similarity of usage characteristics). In the top portion of the illustration, words "writer," "composer" and "drafter" are located near each other, indicating that those three words are used similarly in the word data used to generate the vectors of FIG. 7. Similarly, the words "writing," "composing" and "drafting" are also located near each other, also indicating that those three words are used similarly. The words "write," "compose," and "draft" are not as close in the illustration, with "draft" in particular being located farther away from "write" and "compose" than those words are to each other. This distance may be due to other uses of the word "draft" that may differ from "write" and "compose," for example, "draft" has a known noun form, where the "write" and "compose" do not and "draft" may also have other meanings (such as a cold interior breeze) that differ from "write" and "compose."

Further, the variations of the words (save for "draft") have similar usage relationships relative to each other. For example, the usage relationships of "write" to "writer" to "writing" is similar to the usage relationship between "compose" to "composer" to "composing" as shown by the lines connecting those triplets of words. Other, non-illustrated variations may also exist (such as "writes," "drafted," etc.) with their own vectors and usage relationships to other words.

Creating word embeddings may be an intensive process and thus a pre-trained word embedding system may be used for multiple NLU processes. One such word embedding format is GloVe, mentioned above. Others include word2vec described in Distributed Representations of Words and Phrases and their Compositionality by Tomas Mikolov, Kai Chen, Greg Corrado, and Jeffrey Dean, published in 2013, fasttext described in Enriching Word Vectors with Subword Information by Piotr Bojanowski, Edouard Grave, Armand Joulin, and Tomas Mikolov in 2016, Skip-Thought Vectors by Ryan Kiros, Yukun Zhu, Ruslan Salakhutdinov, Richard S. Zemel, Antonio Torralba, Raquel Urtasun, Sanja Fidler, Quick-Thought Vectors/Quick-Thought loss techniques by Lajanugen Logeswaran and Honglak Lee, and other techniques.

One or more of the herein described system(s) 120 components may implement one or more trained machine learning models. Various machine learning techniques may be used to train and operate such models. Models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, Ada-Boost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply the machine learning techniques, the machine learning processes themselves need to be trained. Training a machine learning component such as, in this case, one of the first or second models, requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As can be appreciated, training, configuration, and structure of a particular trained model may impact the models performance at runtime.

Sequence-to-sequence (seq2seq) models, which have been used for neural machine translation (MT), have been adapted for dialog generation systems. In MT, given a source sentence, the correctness of the target sentence can be measured by its semantic similarity to the source sentence. However, in open-domain conversations, a generic utterance such as "sounds good" could be a correct response to a variety of statements. The seq2seq models are commonly trained with a maximum likelihood objective, which leads the models to place uniform importance on all utterance-response pairs.

Specifically, system components that may be designed to process a goal-oriented utterance (e.g., an utterance requesting the system to execute a command) may be trained in a way to maximize the likelihood of obtaining a correct answer. For example, an NLU component designed to process a goal-oriented utterance may be include a machine learning model trained using a maximum likelihood estimate of a loss function, which may tuned to maximize the likelihood of a safe or mostly correct response. Thus, these models usually choose these safe responses as they appear frequently in the dialog training data. Such responses, while arguably correct, are bland and convey little information leading to short conversations and low user satisfaction in a chatbot scenario. This is reflected by the "general response problem" as discussed above. Systems that are trained by maximizing the averaged likelihood of the training data may suffer from a lack of a clear signal on how well the current conversation is going. Having a way to measure conversational success of a dialog, for example at every turn, can provide valuable information that can guide response generation.

The present system can use a supervised conversation evaluator that measures at least two metrics: engagement (e.g., whether the response will be received positively by a user) and coherence (e.g., whether the response will make sense within the dialog exchange/whether the potential response is an appropriate response to the user input and/or within the dialog conversation thusfar).

Such an evaluator may be trained on a large annotated corpus of example training chatbot conversations. Such a corpus may include text data corresponding to user inputs and system generated responses, as well as annotation data regarding how the human participants in such conversations engaged with the system as it provided its responses to the training conversations. Such training data may result in a better trained model for open dialog management as it consists of utterances exchanged during a conversation (which is in contrast to some open source training data sets that simply gather sentences from other contexts). Further, such training data is based on interactions where the humans know they are interacting with a chatbot. Also, such training data may include both "good" and "bad" conversations allow some evaluation between what results in successful versus unsuccessful chatbot experiences. For present purposes, the training data may come from user-chatbot interactions across several different chatbots.

The training data (which may include text corresponding to a user input, text corresponding to a system generated response the user input, annotation data, or other data relevant to the training dialog/conversation) may be used to train one or more models (such as those used by a dialog management component 265) which may be used at runtime to evaluate the potential success (as measured by coherence and engagement) of a potential system response in a dialog. Thus at runtime a current user input for a runtime dialog may be encoded (for example using an encoder such as 650) along with other data (such as previous user inputs or responses in the dialog), for example into a fixed-length feature vector for processing by the model to evaluate one or more potential responses.

For example, to configure training data for the present system, for a particular system generated response for a user-chatbot interaction, the response may be rated with ground truth annotation data (provided during a training period by human annotators) in four different areas. The first, is the response comprehensible, namely did the information provided by the chatbot make sense to the user with respect to the input user utterance/the dialog conversation thusfar. Second, is the response on-topic, namely is the response relevant to the ongoing topic of the dialog. (For example, if a user asks about a baseball player then the chatbot response should at least mention something about baseball, the player, the player's team, etc.) Third, is the response interesting. (For example, the chatbot may provide an answer about the player in question and potentially some additional information to create a fleshed out response.) Fourth, does the user wish to continue the conversation? (For example, does the chatbot provide a response that encourages the user to ask another utterance furthering the dialog.) Each of the four criteria may be scored during training with a binary value (e.g., 0 representing no or 1 representing yes). Thus, each training dialog response may be associated with a score vector along the lines of [1,1,1,0] which may represent [Comprehensible: Yes; On-Topic: Yes;

Interesting: Yes; Continue: No]. Each response of the training data may include such a score vector.

Using such training data, the system may train a group of dialog evaluators, where each dialog evaluator may be trained to process a potential dialog response and output a score that can be used to evaluate that potential dialog response. Such evaluators may include evaluators 860 as shown and discussed below with regard to FIGS. 8 and 9. Thus there may be one evaluator that is configured to output a comprehensible score (e.g., comprehensible scorer 862), one evaluator that is configured to output an on-topic score (e.g., on-topic scorer 864), one evaluator that is configured to output an interesting score (e.g., interesting scorer 866) and one evaluator that is configured to output a continue score (e.g., continue scorer 868). Such evaluators may be used at runtime to output respective scores that may be used to evaluate potential dialog responses.

The above factors (comprehensible, on-topic, interesting, continue) may be used as proxies for measuring coherence and engagement of responses. For example, a coherence score may be determined using a combination of a comprehensible score and an on-topic score while an engagement score may be determined using a combination of an interesting score and a continue score. In a further example, a coherence score may be a sum of a comprehensible score and an on-topic score, a weighted sum of a comprehensible score and an on-topic score (where each score is weighted before summation), or some other combination. Further, an engagement score may be a sum of an interesting score and a continue score, a weighted sum of an interesting score and a continue score (where each score is weighted before summation), or some other combination.

Figure 8:
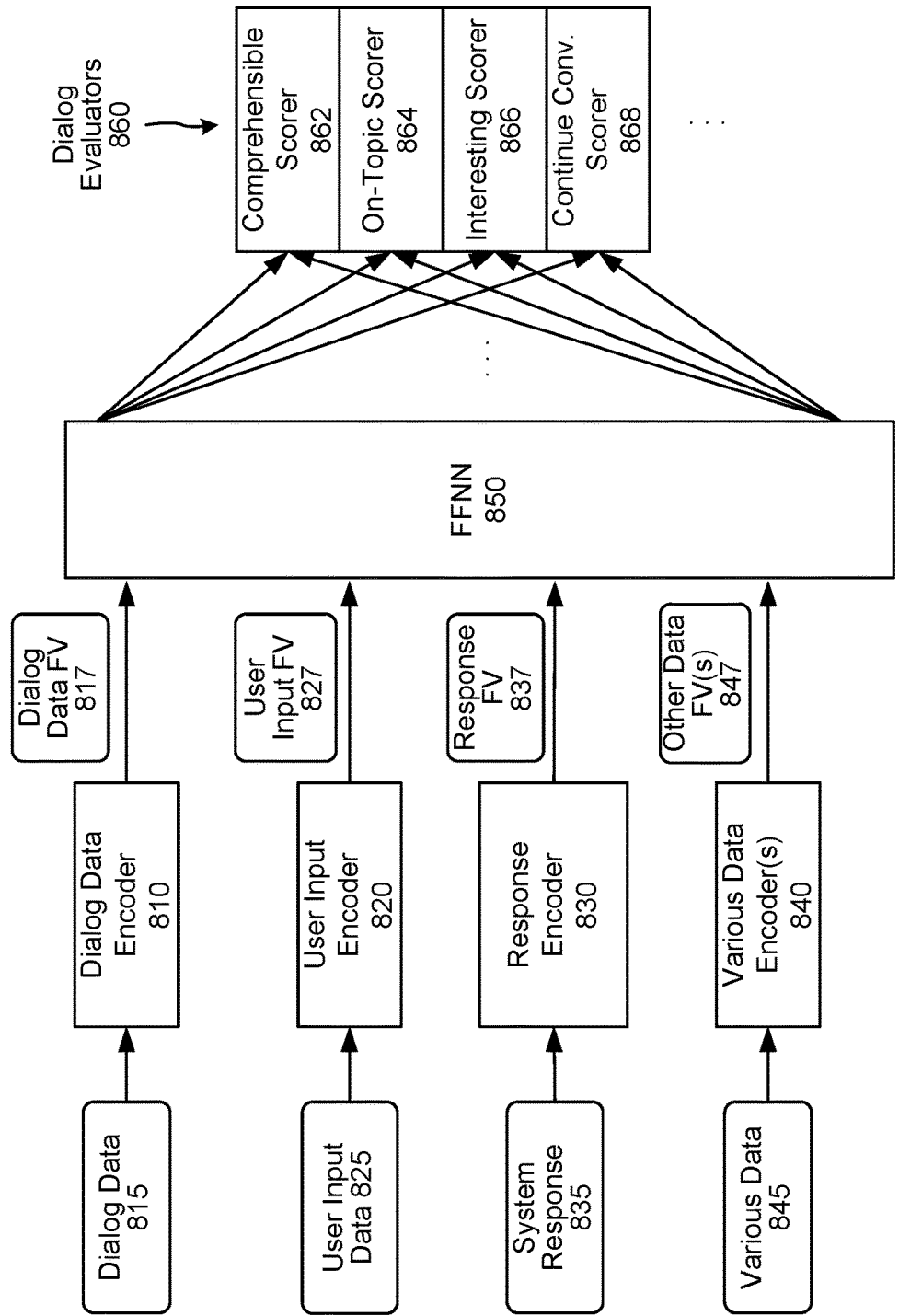
FIG. 8 illustrates training dialog evaluators according to embodiments of the present disclosure.

FIG. 8 illustrates a configuration for training dialog evaluators 860. As shown in FIG. 8, various data may be used to train dialog evaluators 860. Each training example corresponding to a particular training dialog system response may include dialog data 815, which may include the text of previous turns of the dialog (which itself may include text of user inputs and corresponding system responses) as well as other context data relevant to the dialog, the current user input data 825 (which may include the text of the current turn's user input) and the potential response 835 of the training example (which was returned in response to the user input 825 in the training example). For model training purposes, the dialog data may be encoded by a dialog context encoder 810 which may be configured to output a dialog data feature vector 817. The dialog data encoder 810 may include an LSTM encoder that can encoded context. The encoder 810 may be trained with 1-layer and 256 dimension hidden units.

The user input data 825 may be encoded using user input encoder 820 that can output user input feature vector (FV) 827. User input feature vector 827 may correspond to a word embedding or sentence embedding using embedding techniques discussed above. Similarly, system response 835 may be encoded using response encoder 830 that can output response feature vector (FV) 837. Response feature vector 837 may correspond to a word embedding or sentence embedding using embedding techniques discussed above.

The training data for a particular response may also include various data 845. The various data 845 may include other data that may be relevant to scoring/selecting a dialog response. For example, the various data 845 may include Dialog Act (DA) data that may correspond to a Dialog Act. Such Dialog Act data may be predicted using a trained model trained on user utterances and responses as a feature. The various data 845 may also include entity grid information. Entity grid information may include data corresponding to a grid representation of dialog turns and entities as a matrix (e.g., DAs x entities). Such information may be designed to capture patterns of topic shift and intent shift distribution of a coherent dialog. The various data 845 may also include context data. For example, an utterance and appropriate responses in a current dialog turn may refer to context from previous turns. Embeddings and responses for a previous N turns (e.g., five turns) may be concatenated and used as an input feature. This concatenation may be passed through an LSTM layer to add to the context, where utterance embeddings and corresponding response embeddings from these past five turns are added sequentially to obtain the encoded representation, which is then concatenated with other features in a fully-connected neural network.

The various data 845 may also include named entity overlap data. For example, a Boolean feature indicating if a named entity is included both in the user utterance (for example as represented by user input data 825) and in the system response (for example as represented by system response 835). The various data 845 may also include user utterance sentiment and associated sensitivity as a two dimensional continuous feature. For example, such data may be obtained from TextBlob. The various data 845 may also include topic data. For example, a trained model may be configured to evaluate a current turn of dialog, a previous turn of dialog, or multiple turns of dialog to classify the dialog or dialog portion into one or more topics (e.g., sports, politics, movies, etc.). The dialog classifier may output, for example, a one-hot representation of the topic for the particular dialog portion. Such a representation may be included in the various data 845. The various data 845 may also include response similarity, such as the cosine similarity between the user utterance embedding (e.g., user input feature vector 827) and the chatbot response embedding (e.g., response FV 837). The various data 845 may also include length of the user utterance and/or chatbot response. For example the token-level length (e.g., word level length) may be considered. The various data 845 may also include parts-of-speech (POS) data which may be determined by a POS tagger or other component. For example a bag-of-words representation of POS tags may be produced for a user utterance and/or system response and considered as part of the various data 845.

The various data 845 may be encoded by an encoder such as one or more various data encoder(s) 840. Multiple such encoders 840 may be used, each configured to encode a particular type of various data 845. The resulting encoded feature vectors 847 may then be used in training.

The encoders 810, 820, 830 and/or 840 may be trained with the evaluators 860 or may be trained separately.

The encoded feature vectors 817, 827, 837, and 847 may be concatenated and processed using feed forward neural networks (FFNN) (850) to train the evaluators 860 (e.g., comprehensible scorer 862, on-topic scorer 864, interesting scorer 866, and continue scorer 868). The FFNN 850 may include, for example, a three layer FFNN with 256 hidden units. The output layer of the FFNN 850 is a four dimensional vector, with each dimension corresponding to a binary decision for each evaluation metric, e.g., the ground truth data, which may include a vector of binary values for the four factors discussed above, e.g., [Comprehensible; On-Topic; Interesting; Continue]. The evaluators 860 may be trained jointly. Once trained, at runtime the evaluators 860 may be configured to take input data for a particular dialog turn (e.g., dialog data, user input data, a potential system response, and various data) to output four scores (one each by a respective evaluator) to correspond to the four factors.

Different evaluators 860 may also be trained in addition to (or instead of) the evaluators illustrated with regard to FIG. 8. Other models may allow the system to evaluate other dialog qualities beyond those discussed above. For example, for a dialog experience that is desired to be entertaining, a model may be trained using training data indicating whether a user felt entertained for the training dialog exchanges. The system may then train a model that evaluates whether a potential dialog response is likely to entertain a user. In another example, for a dialog experience that is desired to be as short as possible, a model may be trained using training data indicating whether the dialog response resulted in a short or lengthy dialog. The system may then train a model that evaluates whether a potential dialog response is likely to lead to a short dialog. As can be appreciated, many different such models may be trained. At runtime, those models may be used to evaluate and select a potential dialog response, for example using techniques described with regard to FIG. 9.

Figure 9:
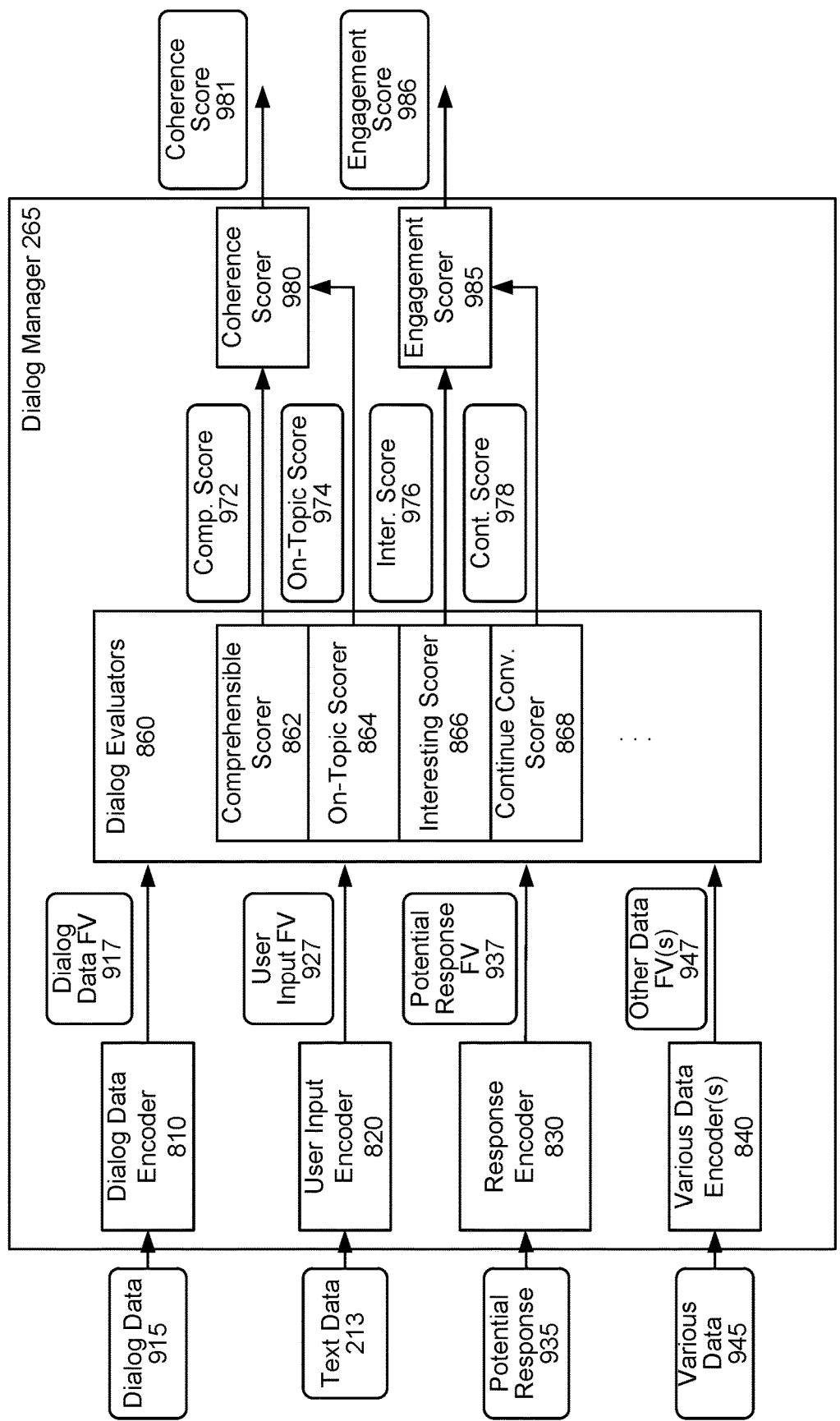
FIG. 9 illustrates runtime use of dialog evaluators according to embodiments of the present disclosure.

A runtime evaluation example is illustrated in FIG. 9. Various components of FIG. 9 may be implemented as part of the dialog manager 265. As shown, the input data dialog data 915, text data 213, potential response 935 and various data 945 correspond to similar data as discussed with FIG. 8 in the training example. The dialog data 915 may include data regarding the ongoing runtime dialog. The text data 213 may correspond to the text of the current utterance being considered. The potential response 935 may correspond to the particular potential response being scored as to how well it responds to the current utterance (where each of an N best list of potential responses may be scored to ultimately select the best response). The various data 945 corresponds to various other data (such as various data 845) that the system may consider. The input data may be encoded using the respective encoders to determine the input data to be considered by the evaluators, for example dialog data FV 917, user input FV 927, potential response FV 937, and other data FV(s) 947. The dialog data FV, user input FV 927 and potential response FV 937 may correspond to word and/or sentence embeddings that are determined using techniques described above. While specifically referred to as FVs here, the inputs to the dialog evaluators 860 may also be referred to as text data or simply data. For example dialog text data or dialog data (e.g., the dialog text or dialog data FV 917), input text data or input data (e.g., the utterance text or user input FV 927), response data or response text data (e.g., the potential response or potential response FV 935), etc. The input data may be passed separately to each of the evaluators 860 to output four scores. For example, comprehensible scorer 862 may be used to process the input data to arrive at a comprehensible score 972, on-topic scorer 864 may be used to process the input data to arrive at an on-topic score 974, interesting scorer 866 may be used to process the input data to arrive at an interesting score 976, and continue conversation scorer 868 may be used to process the input data to arrive at a continue score 978.

The system may also operate on those scores to obtain a coherence score 981 and an engagement score 986. For example, a coherence scorer 980 may operate on the comprehensible score 972 and on-topic score 974 to determine a coherence score 981. The engagement scorer 985 may similarly operate on the interesting score 976, and continue score 978 to determine an engagement score 986. As noted above, the coherence score 981 may be a sum of a comprehensible score 972 and an on-topic score 974, a weighted sum of a comprehensible score 972 and an on-topic score 974 (where each score is weighted before summation), or some other combination. Further, an engagement score 986 may be a sum of an interesting score 976 and a continue score 978, a weighted sum of an interesting score 976 and a continue score 978 (where each score is weighted before summation), or some other combination.

The system may then use some combination of scores (e.g., comprehensible score 972, on-topic score 974, coherence score 981, interesting score 976, continue score 978, and/or engagement score 986) to determine which potential response to a user utterance should be selected. For example the system may process a coherence score 981 and engagement score 986 to arrive at an overall score, which may be a sum of those scores, some weighted combination of those scores, etc. The potential system response with the highest score may be selected.

Figure 10:
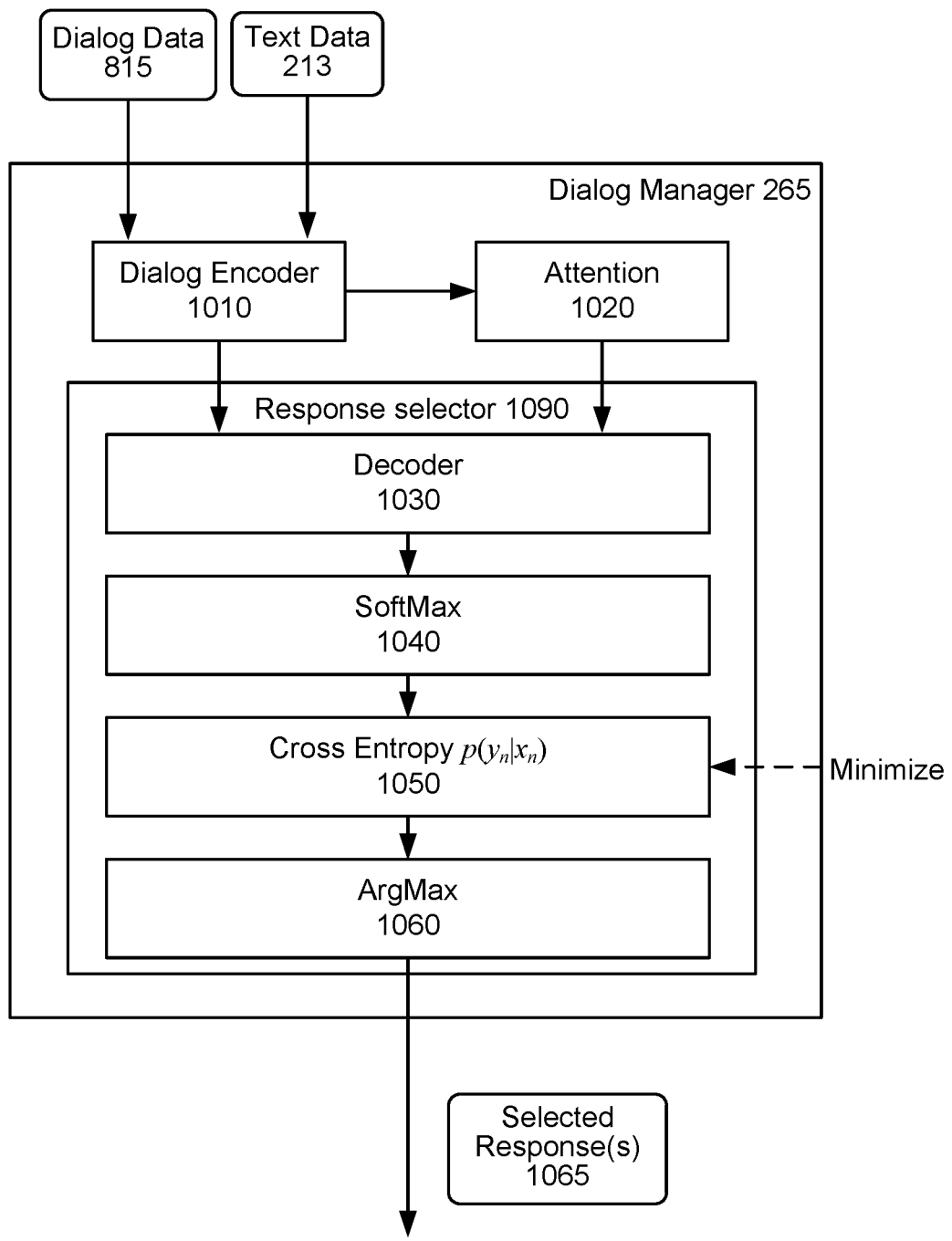
FIG. 10 illustrates processing dialog data to obtain a selected response.

The system may also use different configurations of models to evaluate potential responses in view of the scores determined as explained in reference to FIG. 9. FIG. 10 illustrates processing dialog data using a baseline response generator to obtain a selected response without considering the scores. As shown, dialog data 815 and text data 213 may be encoded by a dialog encoder 1010. A special transition token may be inserted between past utterance, past response, and current utterance with a single RNN to encode the dialog context. The dialog context may include text related to previous turns of the dialog (which may be part of dialog data 815) along with the text data 213 of the current user input to be responded to. The dialog context may include embedded representations of words, sentences, etc. The dialog context may also include other data such as device type, user profile data, etc. that may impact the dialog turn. The output of the encoder 1010 may be sent directly to the response selector 1090 as well as to an attention component 1020 which may weight certain text from certain dialog turns for purposes of downstream processing. Thus, an encoded feature vector (which may include encoded feature data corresponding to the dialog data 815 as well as encoded feature data corresponding to the text data 213) may be sent to the attention component 1020 for weighting. For example, the attention component 1020 may result in greater attention being paid to more recent dialog data. The output from the attention component 1020 (e.g., attention data) may also be fed to the response selector 1090 that inputs the dialog data and weighted data to select a response to the user input (as reflected by text data 213).

The response selector 1090 may include a decoder 1030, softmax layer 1040, cross entropy layer 1050 and argmax layer 1060. The cross entropy layer 1050 may be trained to minimize loss. In certain configurations the system may use a 1-layer Gated Recurrent Neural (GRU) network with 512 hidden units for both the encoder 1010 and decoder 1030 to train the sequence to sequence (seq2seq) model and may use maximum likelihood estimation (MLE) as the training objective.

As shown in FIG. 10, the response selector 1090 may output selected response(s) 1065 which may include the text of the top scoring potential system response or may include an N-best list of selected responses as determined by the response selector 1090. The output selected response may be sent to a further component (such as the orchestrator 230, TTS 280, etc.) for further processing and eventual output to the user (such as in the form of audio data, returned text, executed function by a skill, or the like).

Figure 11:
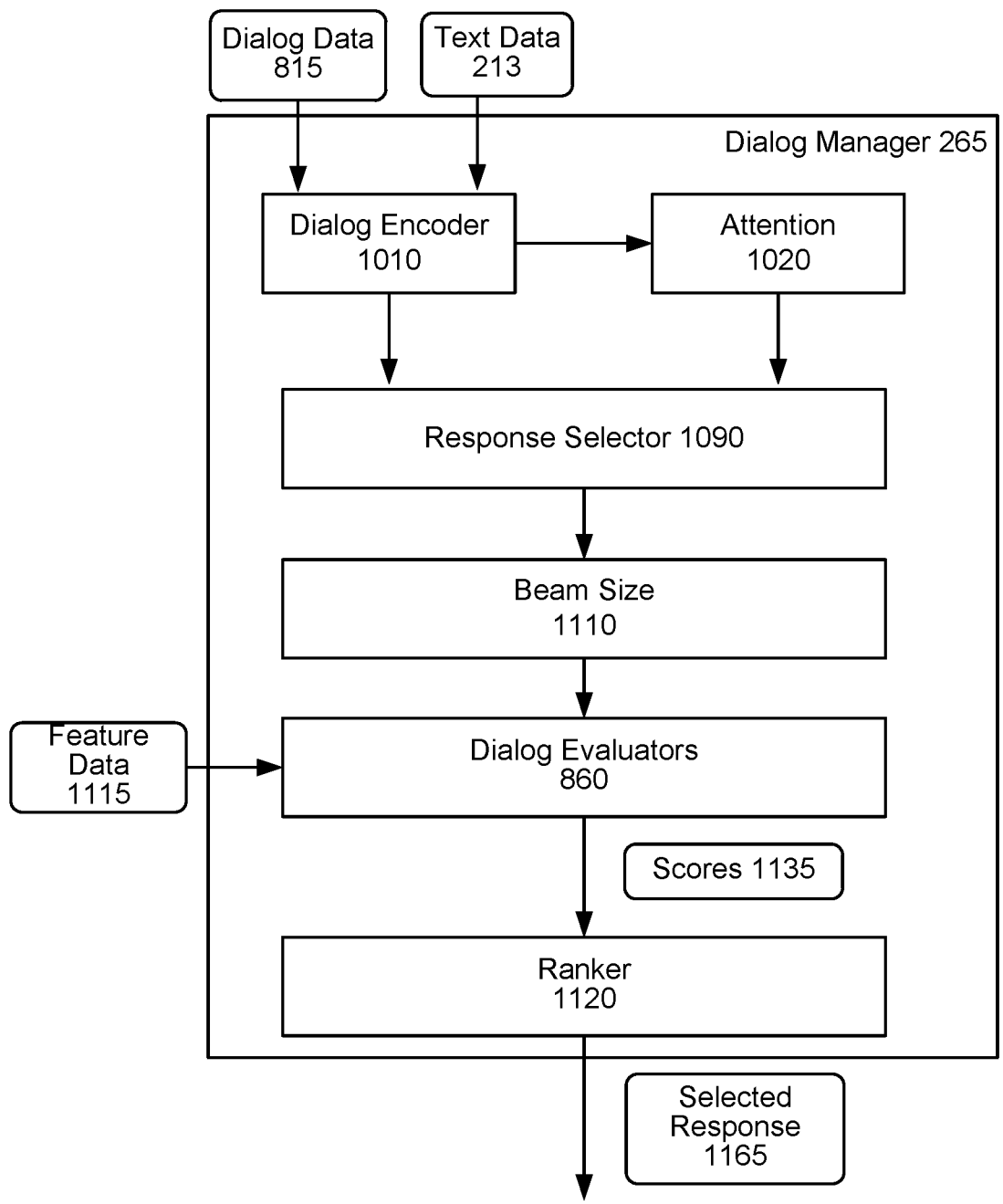
FIG. 11 illustrates using output from dialog evaluators to rank potential responses according to embodiments of the present disclosure.

The output of the response selector 1090 of FIG. 10 may then be used with the scores discussed above to rank the potential selected responses. As discussed herein, scores 1135 may include, for example, comprehensible score 972, on-topic score 974, coherence score 981, interesting score 976, continue score 978, and/or engagement score 986. As shown in FIG. 11, the response selector 1090 is a generalized response selector 1090 that is not trained in a manner that considers the potential scores 1135. To consider the scores, the dialog manager may process the N-best list of potential responses as output by the response selector 1090 (which may prune the N-best list to a certain size using beam size component 1110) using the dialog evaluators 860.

As shown in FIG. 11, the top N-best potential responses are sent to the dialog evaluators 860 along with the relevant feature data 1115, which may include, for example, the input data discussed above with regard to FIG. 9 (e.g., dialog data, 815, text data 213, various data 945, etc.). The dialog evaluator may then output the scores 1135 for each of the N-best potential responses. The scores 1135 may then be evaluated by a ranker 1120 which may then determine and output a top selected response 1165. The output selected response may be sent to a further component (such as the orchestrator 230, TTS 280, etc.) for further processing and eventual output to the user (such as in the form of audio data, returned text, executed function by a skill, or the like).

Thus in the ranking approach of FIG. 11, the underlying response selector model 1090 is not updated. Rather, instead the highest scoring N-best responses are selected. In one embodiment, the top of the N-best responses output by the response selector 1090 may be equivalent to the output of a baseline model. For each of the N-best responses, the system may calcite a BLEU score relative to the top response. BLEU (bilingual evaluation understudy) is an algorithm typically used for evaluating the quality of text which has been machine-translated from one natural language to another. BLEU scores are calculated for individual text segments—generally sentences—by comparing them with a set of good quality reference text segments. In this case, other N-best outputs compared to the top N best output. BLEU output may be between 0 and 1. This value indicates how similar the candidate text is to the reference texts, with values closer to 1 representing more similar texts.

The system may sample two sentences from the N-best, the one with the higher BLEU becomes a positive example and the one with lower BLEU becomes a negative example (pairwise ranking). This may be done for all possible candidate combinations from the N-best. The input to the ranker 1120 is the softmax output of the scores 1135 (which may include for example, the comprehensible score 972, the on-topic score 974, the interesting score 976, and the continue score 978). The output of the ranker 1120 is a scalar which is higher for the utterances with higher BLEU scores.

Figure 12A:
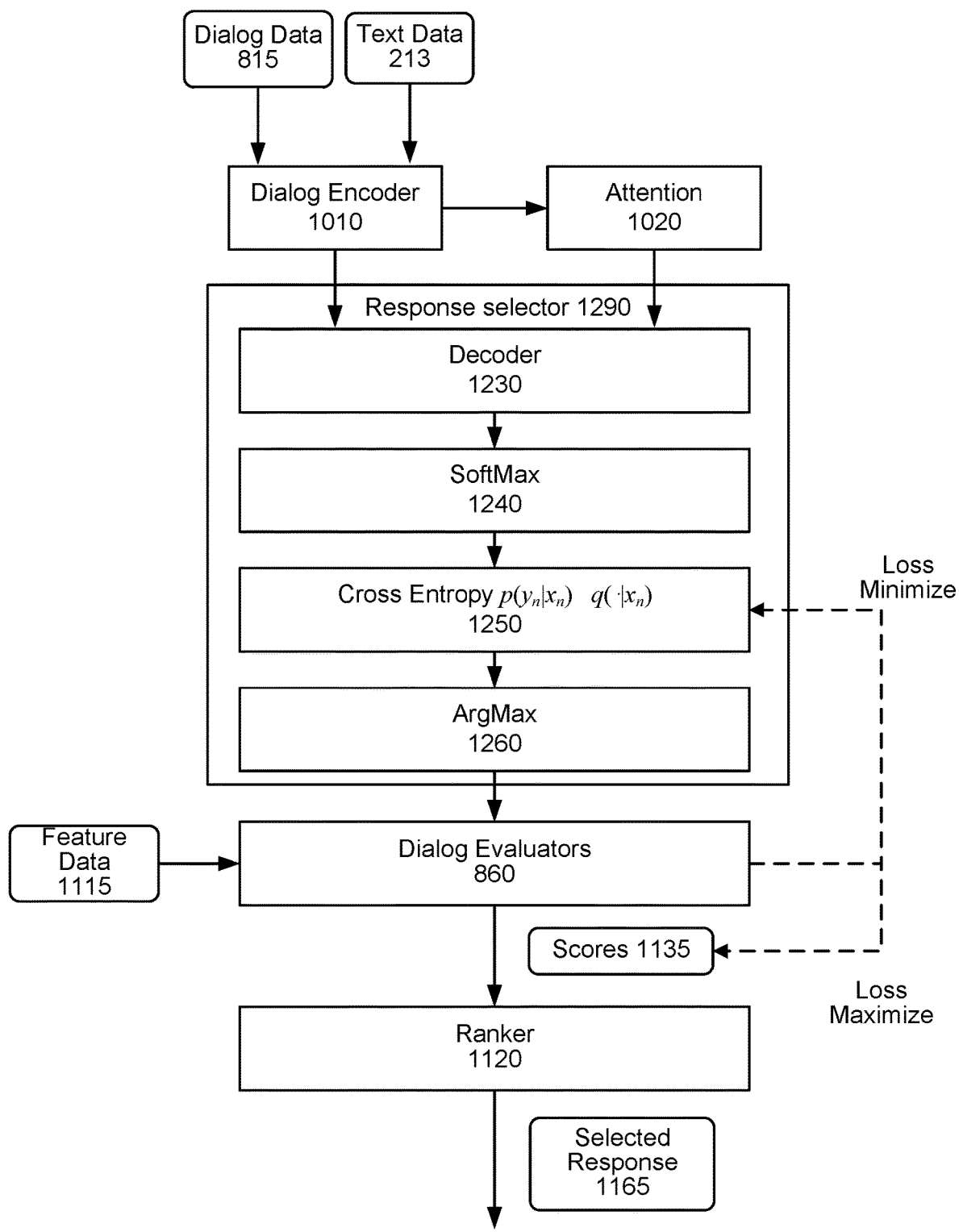
FIG. 12A illustrates training a response selector using output from dialog evaluators to rank potential responses according to embodiments of the present disclosure.

In another example, shown in FIG. 12A, a response selector 1290 may be trained using some information about the scores and combined with the post-selection evaluation and ranking as done by evaluators 860 and ranker 1120. In this approach, the encoder and decoder may be fine-tuned using the scores 1135. Once the baseline model (e.g., 1090) is trained, it is then fine-tuned to generate more coherent and engaging responses. One issue with MLE is that the learned models may not be optimized for the final metric (e.g., BLEU). To address this, a discriminatory loss model may be added in addition to the generative loss to the overall loss term as shown in Equation 1.

$$\text{loss} = \sum_{i=1}^{max\_len} p(y_{ni} | z_n)\log(q(y_{ni} | z_n)) - \lambda \|Eval(x_n, q(. | z_n)\|_1 \quad (1)$$

where x is the user input text for a particular turn, y is the system response for a particular turn, z is the dialog context at turn n (e.g., $z_n = x_n, y_{n-1}, \ldots x_0, y_0$; n=context_len).

The decoder 1230 is fine-tuned to maximize the sum of the scores of the training examples along with minimizing the cross-entropy loss. In Equation 1, q (V×k) corresponds to the softmax output generated by the response generation model. The first term corresponds to the cross-entropy loss while the second term corresponds to the discriminative loss. The evaluator models are trained on the original annotated corpus and parameters are frozen. The discriminator score may be weighted by λ, which is a hyper-parameter. λ is selected using grid search to optimize for final BLEU on a development set.

The evaluators 860 may be used as the discriminator to favor more coherent and engaging responses along with maximizing the likelihood of a generated response. An overall evaluator score is defined as the sum of softmax outputs of all 4 scoring models 862, 864, 866 and 868. In a standalone evaluation setting, the evaluator will take one hot representation of the user utterance as input, e.g., the input is k-tokens long which is passed through an embedding lookup layer which makes it D×k input to rest of the network. D is size of the word embeddings. To make the loss differentiable, the system may use the output of the softmax layer 1240 (distribution of likelihood across entire vocabulary for output length k, i.e., |V|×k) and use this to do a weighted embedding lookup across the entire vocabulary to get the same D×k matrix as an input to rest of the evaluator network. The system may keep the rest of the input (context and features) for the evaluator required to predict the scores as is.

The cross entropy layer 1250 may be trained with an additional loss function q, which corresponds to the evaluator loss. Thus the response selector 1290 may be trained to reduce the negative part of the second half of Equation 1 above, thus maximizing the value of the scores from the evaluators 860, and thus obtaining a selected response that has a best combination of scores 1135.

Thus, the configuration of 11 may incorporate a response selector 1290 (that is trained using some information about the scores) along with a ranker 1120, which may improve selection of a best response over the combination of a generic response selector 1090 and ranker 1120.

Figure 12B:
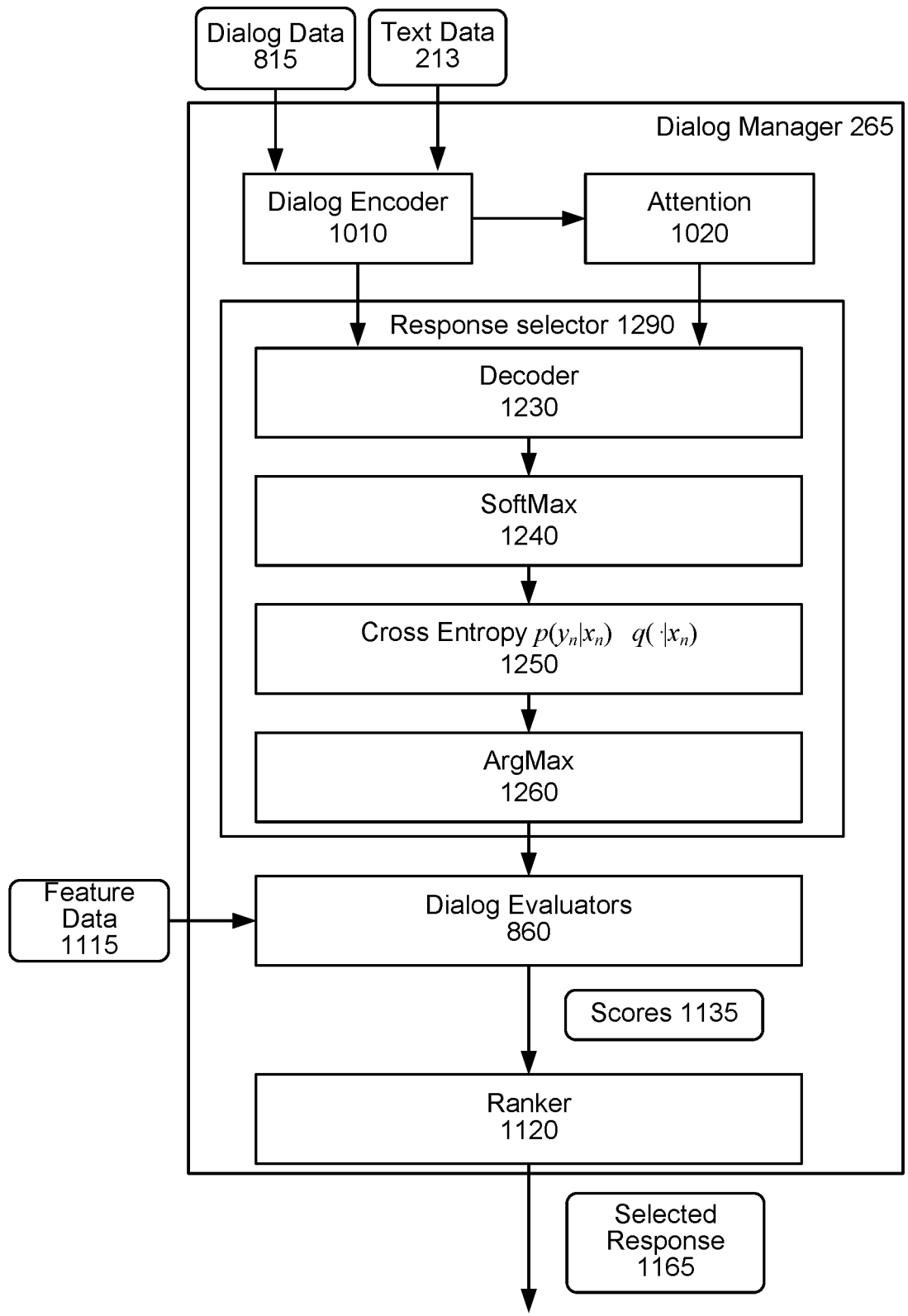
FIG. 12B illustrates using output from dialog evaluators to rank potential responses according to embodiments of the present disclosure.

Thus, at runtime the system may use a configuration such as that shown in FIG. 11 or that shown in FIG. 12B to determine a most appropriate system response for a user utterance as part of a dialog. In another embodiment the system may use the response selector 1290 of FIG. 12B without adding the ranker 1120 to the end, thus only employing the response selector 1290 that is trained using evaluator data without necessarily adding the ranker 1120. As can be appreciated, different configurations are possible.

Whichever responses is selected using any of the techniques described above, the system may return the selected response to the user in the form of text data (e.g., to device 110b) or in the form of audio data, passing the responses through TTS component 280 and sending the resulting audio data back to the user for output, for example through device 110a.

Figure 13:
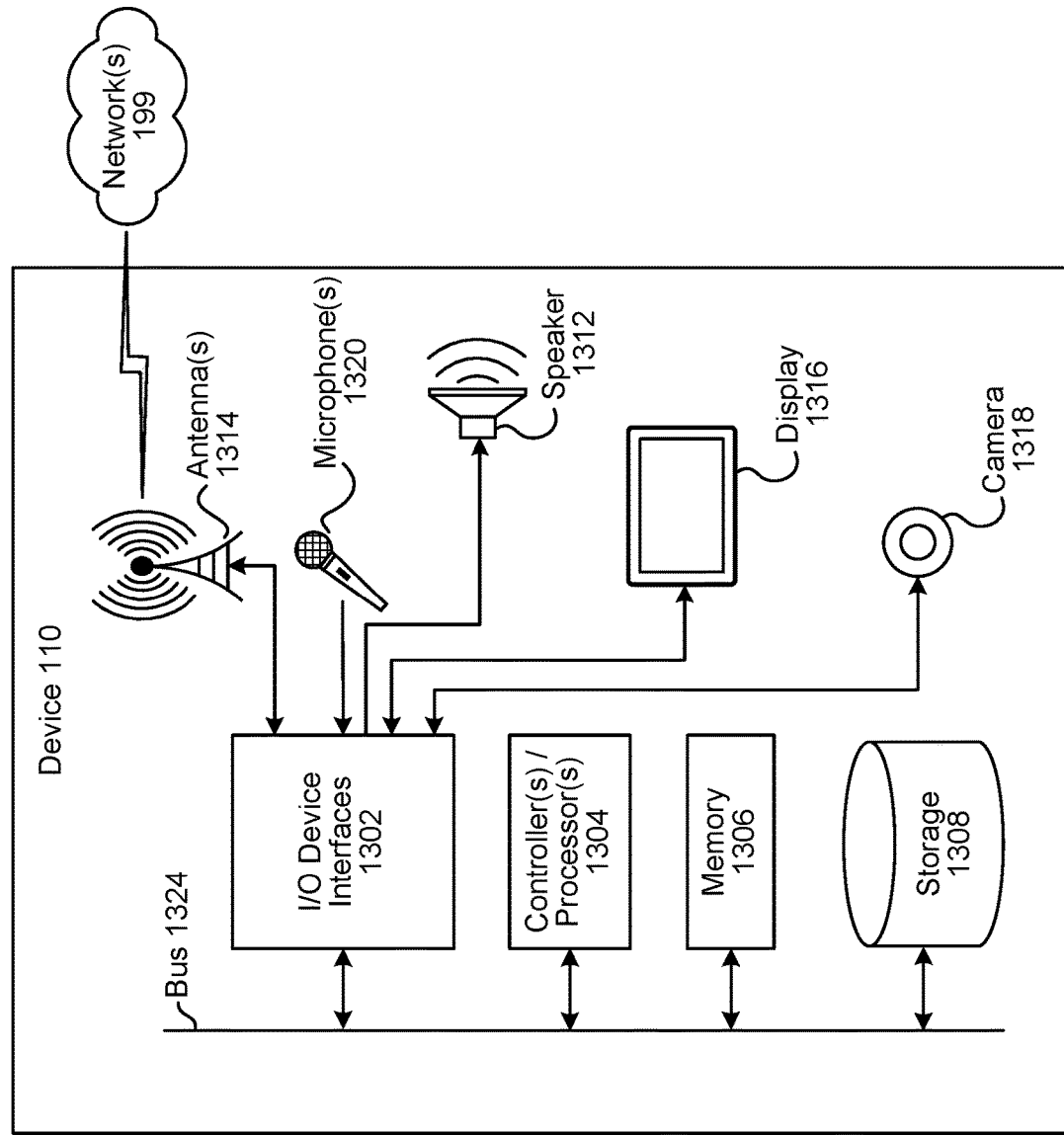
FIG. 13 is a block diagram conceptually illustrating example components of a device according to embodiments of the present disclosure.
Figure 14:
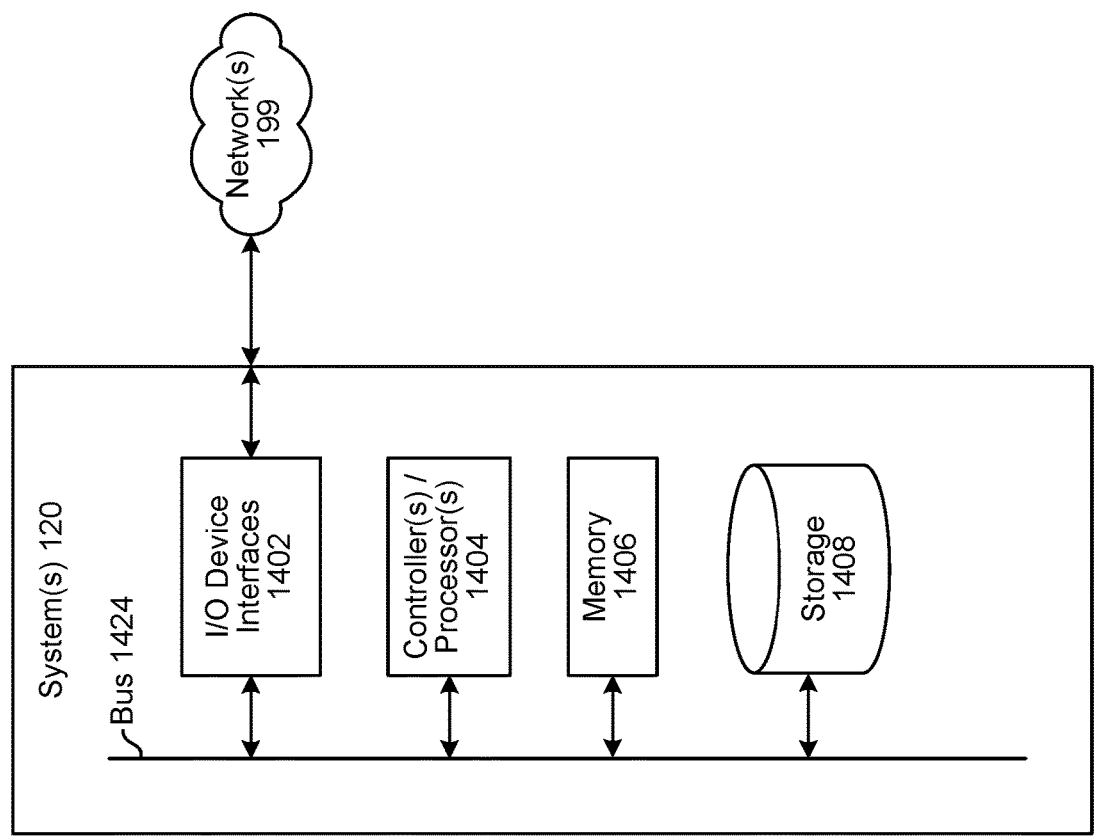
FIG. 14 is a block diagram conceptually illustrating example components of a server according to embodiments of the present disclosure.

FIG. 13 is a block diagram conceptually illustrating a device 110 that may be used with the system. FIG. 14 is a block diagram conceptually illustrating example components of a remote device, such as the system(s) 120, which may assist with ASR processing, NLU processing, etc., and the skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The server(s) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more systems 120 for performing ASR processing, one or more systems 120 for performing NLU processing, one or more skill systems 225 for performing actions responsive to user inputs, etc. In operation, each of these systems may include computer-readable and computer-executable instructions that reside on the respective device (120/225), as will be discussed further below.

Each of these devices (110/120/225) may include one or more controllers/processors (1304/1404), which may each include a central processing unit (CPU) for processing data and computer-readable instructions, and a memory (1306/1406) for storing data and instructions of the respective device. The memories (1306/1406) may individually include volatile random access memory (RAM), non-volatile read only memory (ROM), non-volatile magnetoresistive memory (MRAM), and/or other types of memory. Each device (110/120/225) may also include a data storage component (1308/1408) for storing data and controller/processor-executable instructions. Each data storage component (1308/1408) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1302/1402).

Computer instructions for operating each device (110/120/225) and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each device (110/120/225) includes input/output device interfaces (1302/1402). A variety of components may be connected through the input/output device interfaces (1302/1402), as will be discussed further below. Additionally, each device (110/120/225) may include an address/data bus (1324/1424) for conveying data among components of the respective device. Each component within a device (110/120/225) may also be directly connected to other components in addition to (or instead of) being connected to other components across the bus (1324/1424).

Referring to FIG. 13, the device 110 may include input/output device interfaces 1302 that connect to a variety of components such as an audio output component such as a speaker 1312, a wired headset or a wireless headset (not illustrated), or other component capable of outputting audio. The device 110 may also include an audio capture component. The audio capture component may be, for example, a microphone 1320 or array of microphones 1320, a wired headset or a wireless headset (not illustrated), etc. If an array of microphones 1320 is included, approximate distance to a sound's point of origin may be determined by acoustic localization based on time and amplitude differences between sounds captured by different microphones of the array. The device 110 may additionally include a display 1316 for displaying content. The device 110 may further include a camera 1318.

Via antenna(s) 1314, the I/O device interfaces 1302 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interfaces (1302/1402) may also include communication components that allow data to be exchanged between devices such as different physical servers in a collection of servers or other components.

The components of the device(s) 110, the system(s) 120, or the skill system(s) 225 may include their own dedicated processors, memory, and/or storage. Alternatively, one or more of the components of the device(s) 110, the system(s) 120, or the skill system(s) 225 may utilize the I/O device interfaces (1302/1402), processor(s) (1304/1404), memory (1306/1406), and/or storage (1308/1408) of the device(s) 110 system(s) 120, or the skill system(s) 225, respectively. Thus, the ASR component 250 may have its own I/O device interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110, the system(s) 120, and the skill system(s) 225, as described herein, are illustrative, and may be located as a stand-alone device or may be included, in whole or in part, as a component of a larger device or system.

Figure 15:
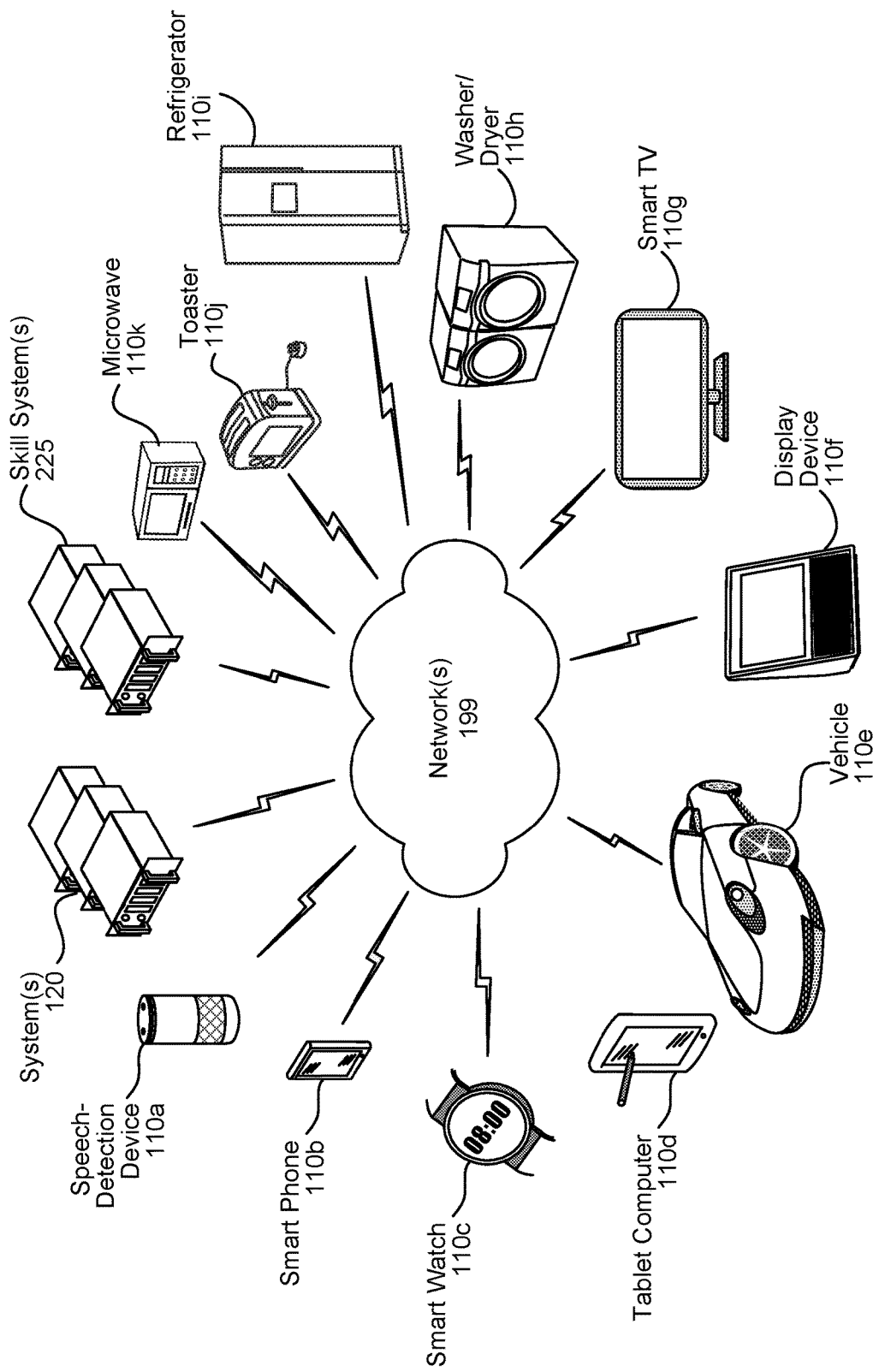
FIG. 15 illustrates an example of a computer network for use with the speech processing system.

As illustrated in FIG. 15, multiple devices (110*a*-110*k*, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110*a*, a smart phone 110*b*, a smart watch 110*c*, a tablet computer 110*d*, a vehicle 110*e*, a display device 110*f*, a smart television 110*g*, a washer/dryer 110*h*, a refrigerator 110*i*, a toaster 110*j*, and/or a microwave 110*k* may be connected to the network(s) 199 through a wireless service provider, over a WiFi or cellular network connection, or the like. Other devices are included as network-connected support devices, such as the system(s) 120, the skill system(s) 225, and/or others. The support devices may connect to the network(s) 199 through a wired connection or wireless connection. Networked devices may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more systems 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method for selecting a chatbot response to a user utterance, the method comprising:
    receiving input audio data corresponding to a user input to a chatbot dialog corresponding to an exchange between a user and a system;
    performing automatic speech recognition (ASR) processing on the input audio data to determine input text data;
    determining dialog text data corresponding to at least one previous user utterance and at least one previous system response, the at least one previous user utterance and at least one previous system response corresponding to the exchange;
    processing the input text data and the dialog text data to determine a plurality of potential system responses to the user input, the plurality including a first potential system response corresponding to response text data;
    processing the input text data, the dialog text data, and the response text data to determine a first score representing a likelihood that the first potential system response will be comprehensible to a user;
    processing the input text data, the dialog text data and the response text data to determine a second score representing a likelihood that the first potential system response corresponds to a topic of the exchange;
    processing the first score and the second score to determine an indicator representing a likelihood that the first potential system response will make sense as part of the exchange;
    processing the input text data, the dialog text data and the response text data to determine a third score representing a likelihood that the first potential system response will be received positively by a user;
    processing the indicator and the third score to select the first potential system response;
    perform text-to-speech processing on the response text data to determine output audio data; and
    output the output audio data.

2. The method of claim 1, wherein processing the input text data, the dialog text data and the response text data to determine the third score comprises:
    processing the input text data, the dialog text data and the response text data to determine a fourth score representing a likelihood that the first potential system response will be interesting to a user;
    processing the input text data, the dialog text data and the response text data to determine a fifth score representing a likelihood that the chatbot dialog will continue after output of the first potential system response; and
    processing the fourth score and the fifth score to determine the second score.

3. The method of claim 1, wherein processing the input text data and the dialog text data to determine a plurality of potential system responses to the user utterance comprises:
    processing the input text data to determine first encoded data;

processing the dialog text data to determine second encoded data;

processing the first encoded data and the second encoded data to determine attention data; and processing the first encoded data, the second encoded data, and the attention data to select the plurality of potential system responses.

4. A system, comprising:

at least one processor; and at least one memory comprising instructions that, when executed by the at least one processor, cause the system to:

receive input data corresponding to a user input of a dialog;

process the input data to determine a first potential system response to the user input;

determine first model output data representing a likelihood that the first potential system response will be comprehensible to a user;

determine second model output data representing a likelihood that the first potential system response corresponds to a topic of the dialog;

determine, based at least in part on the first model output data and the second model output data, an indicator representing that the first potential system response is an appropriate response to the user input;

determine, third model output data representing a likelihood that the first potential system response will be received positively by a user;

use the indicator and the third model output data to select the first potential system response; and determine output data corresponding to the first potential system response.

5. The system of claim 4, wherein the at least one memory further comprises instructions that, when executed by the at least one processor, further cause the system to:

determine dialog data representing at least one previous user input and at least one previous system response of the dialog;

determine response data representing the first potential system response; and determine the indicator the dialog data, and the response data.

6. The system of claim 5, wherein the dialog data further comprises one or more of:

first data representing an entity corresponding to the dialog;

second data representing a topic corresponding to the dialog; and third data representing a part-of-speech corresponding to the dialog.

7. The system of claim 5, wherein the at least one memory further comprises instructions that, when executed by the at least one processor, further cause the system to:

process the input data to determine first encoded data;

process the dialog data to determine second encoded data;

process the first encoded data and the second encoded data to determine attention data; and process the first encoded data, the second encoded data, and the attention data to select a plurality of potential system responses, the plurality including the first potential system response.

8. The system of claim 4, wherein the at least one memory further comprises instructions that, when executed by the at least one processor, further cause the system to:

process the input data to determine a plurality of potential responses, the plurality comprising the first potential system response and a second potential system response;

determine a second indicator representing a likelihood that the second potential system response is an appropriate response to the user;

determine a fourth model output data representing a likelihood that the second potential system response will be received positively by a user; and process the indicator, the second indicator, the third model output data, and the fourth model output data to select the first potential system response.

9. The system of claim 4, wherein the instructions that, when executed by the at least one processor, cause the system to determine the third model output data including instructions that, when executed by the at least one processor, cause the system to:

process the input data, dialog data representing at least one previous user input and at least one previous system response of the dialog, and response data representing the first potential system response to determine a fourth model output data representing a likelihood that the first potential system response will be interesting to a user;

process the input data, the dialog data, and the response data to determine a fifth model output data representing a likelihood that the dialog will continue after output of the first potential system response; and process the fourth model output data and the fifth model output data to determine the third model output data.

10. A method, comprising:

receiving input data corresponding to a user input of a dialog;

processing the input data to determine a first potential system response to the user input;

determining first model output data representing a likelihood that the first potential system response will be comprehensible to a user;

determining second model output data representing a likelihood that the first potential system response corresponds to a topic of the dialog;

determining, based at least in part on the first model output data and the second model output data, an indicator representing that the first potential system response is an appropriate response to the user input;

determining third model output data representing a likelihood that the first potential system response will be received positively by a user;

using the indicator and the third model output data to select the first potential system response; and determining output data corresponding to the first potential system response.

11. The method of claim 10, further comprising:

determining dialog data representing at least one previous user input and at least one previous system response of the dialog;

determining response data representing the first potential system response; and determining the indicator, the dialog data, and the response data.

12. The method of claim 11, wherein the dialog data further comprises one or more of:

first data representing an entity corresponding to the dialog;

second data representing an topic corresponding to the dialog; and third data representing a part-of-speech corresponding to the dialog.

13. The method of claim 11, further comprising:
processing the input data to determine first encoded data;
processing the dialog data to determine second encoded data;
processing the first encoded data and the second encoded data to determine attention data; and
processing the first encoded data, the second encoded data, and the attention data to select a plurality of potential system responses, the plurality including the first potential system response.

14. The method of claim 10, further comprising:
processing the input data to determine a plurality of potential responses, the plurality comprising the first potential system response and a second potential system response;
determining a second indicator representing a likelihood that the second potential system response is an appropriate response to the user;
determining a fourth score model output data representing a likelihood that the second potential system response will be received positively by a user; and
process the indicator, the second indicator, the third model output data, and the fourth model output data to select the first potential system response.

15. The method of claim 10, wherein determining, the third model output data comprises:

processing the input data, dialog data representing at least one previous user input and at least one previous system response of the dialog, and response data representing the first potential system response to determine a fourth model output data representing a likelihood that the first potential system response will be interesting to a user;

processing the input data, the dialog data, and the response data to determine a fifth model output data representing a likelihood that the dialog will continue after output of the first potential system response; and processing the fourth model output data and the fifth model output data to determine the third model output data.

* * * * *